US012667148B2

(12) United States Patent
McIntyre et al.

(10) Patent No.: US 12,667,148 B2
(45) Date of Patent: Jun. 30, 2026

(54) HEATED HAND GARMENT

(71) Applicant: MILWAUKEE ELECTRIC TOOL CORPORATION, Brookfield, WI (US)

(72) Inventors: Joseph R. McIntyre, Milwaukee, WI (US); Gary Lee McMurray, Pewaukee, WI (US); Jesse B. Thompson, North Bend, WA (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 1020 days.

(21) Appl. No.: 17/501,288

(22) Filed: Oct. 14, 2021

(65) Prior Publication Data

US 2022/0030987 A1 Feb. 3, 2022

Related U.S. Application Data

(62) Division of application No. 16/394,091, filed on Apr. 25, 2019, now Pat. No. 11,606,990.

(60) Provisional application No. 62/663,060, filed on Apr. 26, 2018.

(51) Int. Cl.
*A41D 19/015* (2006.01)
*H05B 3/34* (2006.01)

(52) U.S. Cl.
CPC ........ *A41D 19/01535* (2013.01); *H05B 3/342* (2013.01); *H05B 2203/036* (2013.01)

(58) Field of Classification Search
CPC .. A41D 19/00; A41D 19/01535; A41D 1/002; H05B 3/146; H05B 3/34; H05B 3/342; H05B 3/347; H05B 2203/014; H05B 2203/015; H05B 2203/036; H05B 2203/037
See application file for complete search history.

(56) References Cited

U.S. PATENT DOCUMENTS

| | | | |
|---|---|---|---|
| 4,021,640 A | 5/1977 | Gross et al. |
| 4,764,665 A | 8/1988 | Orban et al. |
| 5,035,003 A | 7/1991 | Rinehart |
| 6,060,693 A | 5/2000 | Brown |
| 6,066,164 A | 5/2000 | Macher et al. |
| 7,307,242 B1 | 12/2007 | Chen |
| 7,458,106 B2 | 12/2008 | Yue |

(Continued)

FOREIGN PATENT DOCUMENTS

| | | |
|---|---|---|
| CN | 2513391 Y | 10/2002 |
| CN | 2870507 Y | 2/2007 |

(Continued)

*Primary Examiner* — Hung D Nguyen
(74) *Attorney, Agent, or Firm* — Michael Best & Friedrich LLP

(57) ABSTRACT

A heated hand garment includes a body having a wrist section, and a plurality of digit sections extending therefrom. The heated hand garment further includes a heating element positioned on the body and operable to heat at least a portion of a hand of a user. The heating element includes a connecting portion configured to be positioned on the wrist section, a first digit portion extending from one end of the connecting portion, and a second digit portion extending from an opposite end of the connecting portion. The first digit portion is positioned on a first digit section of the plurality of digit sections, and the second digit portion is positioned on a second digit section of the plurality of digit sections.

21 Claims, 18 Drawing Sheets

(56) References Cited

U.S. PATENT DOCUMENTS

| | | | | |
|---|---|---|---|---|
| 8,664,571 | B2 | 3/2014 | Macher et al. | |
| 2006/0208695 | A1* | 9/2006 | Weinstein | H02J 7/342 320/112 |
| 2007/0095808 | A1 | 5/2007 | Lacy, III | |
| 2007/0174946 | A1 | 8/2007 | Yue | |
| 2008/0223844 | A1 | 9/2008 | Cronn | |
| 2008/0229476 | A1 | 9/2008 | Sanders | |
| 2009/0056107 | A1 | 3/2009 | Williams | |
| 2009/0057289 | A1 | 3/2009 | Williams | |
| 2009/0057290 | A1 | 3/2009 | Williams | |
| 2009/0188905 | A1 | 7/2009 | Williams | |
| 2010/0095947 | A1 | 4/2010 | Gellis | |
| 2012/0074128 | A1* | 3/2012 | Blackford | A41D 13/0051 219/486 |
| 2015/0083704 | A1 | 3/2015 | Guidry | |
| 2015/0083705 | A1 | 3/2015 | Cronn et al. | |
| 2015/0136753 | A1 | 5/2015 | Cronn et al. | |
| 2015/0223290 | A1 | 8/2015 | Shin | |
| 2015/0230524 | A1 | 8/2015 | Stevens et al. | |
| 2015/0282556 | A1* | 10/2015 | Zsolcsak | A43B 3/0031 219/211 |
| 2016/0021945 | A1* | 1/2016 | Richmond | H01M 10/44 219/211 |
| 2016/0095369 | A1 | 4/2016 | Roberts et al. | |
| 2016/0198529 | A1 | 7/2016 | Kurley et al. | |
| 2016/0235139 | A1 | 8/2016 | Gramlin | |
| 2018/0361167 | A1 | 12/2018 | De La Torre Barreiro | |
| 2019/0142086 | A1 | 5/2019 | Dunlop | |
| 2019/0297970 | A1 | 10/2019 | Gramlin | |

FOREIGN PATENT DOCUMENTS

| | | | |
|---|---|---|---|
| CN | 201345907 | Y | 11/2009 |
| CN | 201675059 | U | 12/2010 |
| CN | 201709461 | U | 1/2011 |
| CN | 201805979 | U | 4/2011 |
| CN | 102048268 | A | 5/2011 |
| CN | 201957813 | U | 9/2011 |
| CN | 201967741 | U | 9/2011 |
| CN | 202197888 | U | 4/2012 |
| CN | 202774280 | U | 3/2013 |
| CN | 203015910 | U | 6/2013 |
| CN | 203646554 | U | 6/2014 |
| CN | 204191657 | U | 3/2015 |
| CN | 204292275 | U | 4/2015 |
| CN | 104621801 | A | 5/2015 |
| CN | 104621802 | A | 5/2015 |
| CN | 104687545 | A | 6/2015 |
| CN | 104687549 | A | 6/2015 |
| CN | 204561047 | U | 8/2015 |
| CN | 105286143 | A | 2/2016 |
| CN | 106108182 | A | 11/2016 |
| CN | 206137302 | U | 5/2017 |
| CN | 206324281 | U | 7/2017 |
| CN | 206390349 | U | 8/2017 |
| DE | 7203889 | U | 6/1972 |
| DE | 2818460 | A1 | 11/1979 |
| DE | 3517726 | A1 | 11/1986 |
| DE | 9420307 | U1 | 2/1995 |
| DE | 29805787 | U1 | 5/1998 |
| DE | 29918065 | U1 | 12/1999 |
| DE | 202009008352 | U1 | 9/2009 |
| DE | 102008057717 | B3 | 4/2010 |
| DE | 202012012440 | U1 | 1/2013 |
| TW | M440662 | U1 * | 11/2012 |
| WO | 9533358 | A1 | 12/1995 |
| WO | 2008006731 | A1 | 1/2008 |
| WO | 2008036283 | A2 | 3/2008 |

* cited by examiner

HEATED HAND GARMENT

CROSS-REFERENCE TO RELATED APPLICATIONS

This application is a divisional of U.S. patent application Ser. No. 16/394,091 filed on Apr. 25, 2019, now U.S. Pat. No. 11,606,990, which claims priority to U.S. Provisional Patent Application No. 62/663,060 filed on Apr. 26, 2018, the entire contents of which is incorporated herein by reference.

FIELD OF THE INVENTION

The present invention relates to a heated garment and, more particularly, to a heated garment for a hand of a user such as a glove, a mitten, etc.

BACKGROUND OF THE INVENTION

Heated garments, such as a heated glove, typically include some form of clothing and a heating element for providing heat to the clothing.

SUMMARY OF THE INVENTION

In one independent embodiment, a heated hand garment includes a body having a wrist section, and a plurality of digit sections extending therefrom. The heated hand garment further includes a heating element positioned on the body and operable to heat at least a portion of a hand of a user. The heating element includes a connecting portion configured to be positioned on the wrist section, a first digit portion extending from one end of the connecting portion, and a second digit portion extending from an opposite end of the connecting portion. The first digit portion is positioned on a first digit section of the plurality of digit sections, and the second digit portion is positioned on a second digit section of the plurality of digit sections.

In another independent embodiment, a heated hand garment includes a body, and a heating element positioned on the body and operable to heat at least a portion of a hand of a user. The heated hand garment further includes an electronic controller removably supported by the body. The electronic controller is operable to control charging and discharging of a battery pack configured to be supported by the body. The battery pack is configured to power the heating element.

In yet another independent embodiment, a battery holder assembly includes a rechargeable battery pack and a battery-receiving receptacle. The battery holder assembly is for supplying power to an electronic device. The battery-receiving receptacle is configured to be removably coupled to the electronic device. The battery-receiving receptacle includes a cavity configured to receive the battery pack, an input port for receiving power to charge the battery pack, and an output port for supplying power from the battery pack to the electronic device. The battery holder assembly further includes an electronic controller operable to control charging and discharging of the battery pack while received within the battery-receiving receptacle.

Other independent aspects and features of the invention will become apparent by consideration of the detailed description and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Figure 1:
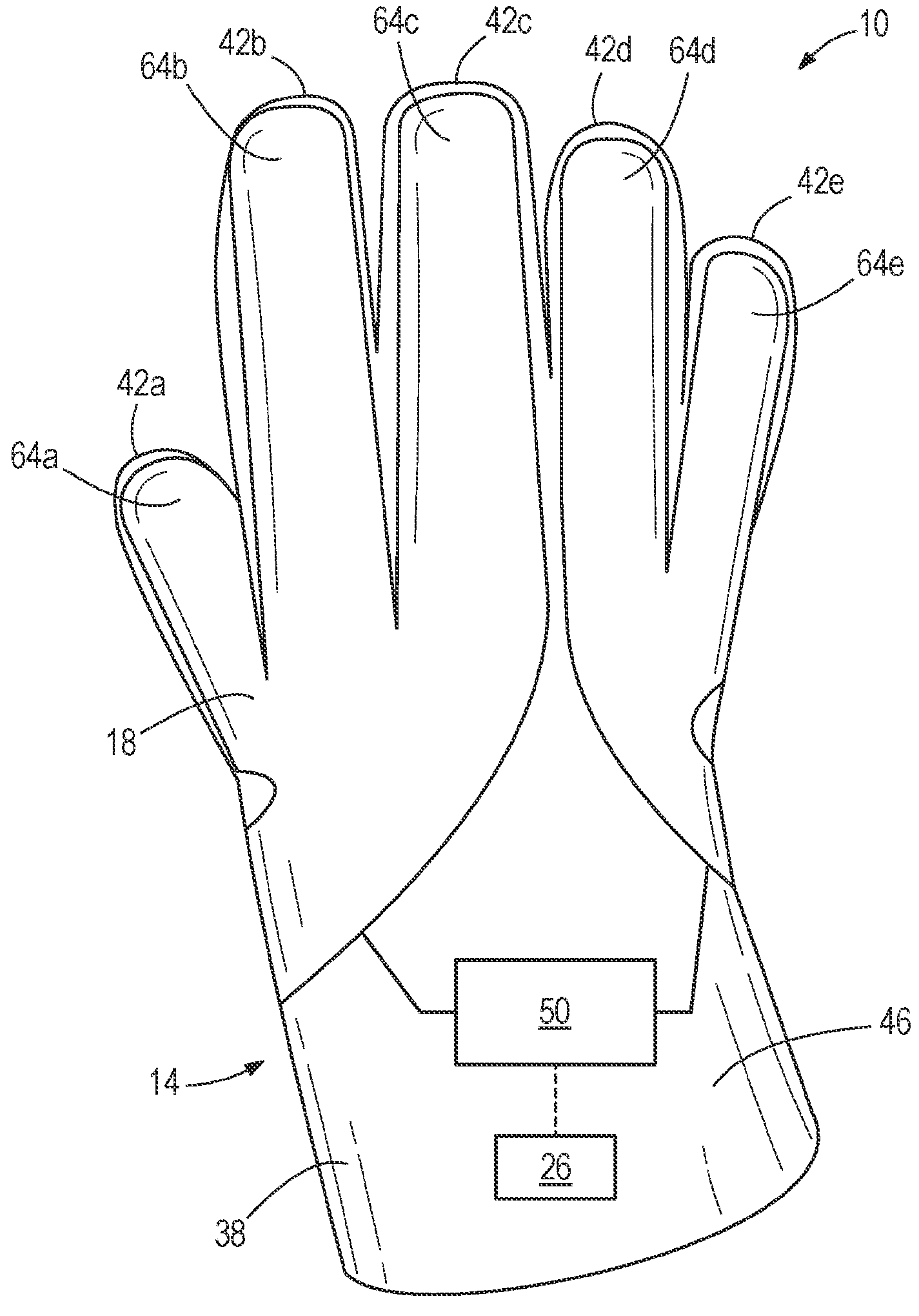
FIG. 1 is a perspective view of a heated garment, such as a glove, including a heating element.
Figure 2:
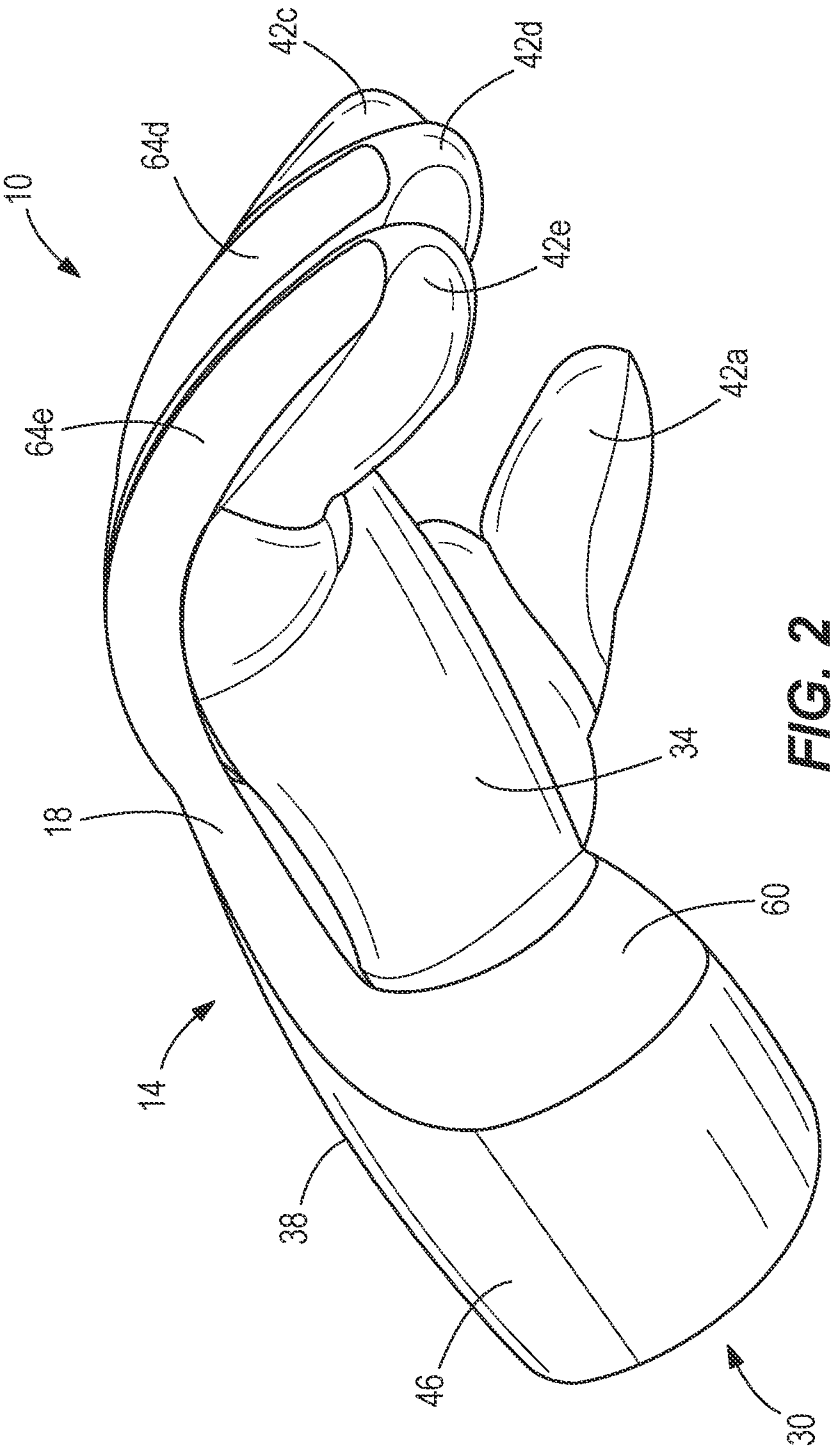
FIG. 2 is another perspective view of the glove of FIG. 1.

FIGS. 1-2 illustrate a heated garment, such as, for example, a glove 10, a mitten, a muff, a sock, other clothing or covering, etc., for a user's extremity (e.g., hand, foot, etc.). In illustrated constructions, each individual heated glove 10 includes a battery pack supported on the glove 10 to supply power to heat at least a portion of a user's hand. Each individual glove 10 also includes a controller on the glove 10 operable to control discharging and charging of the battery pack, heating of the glove 10, etc.

The illustrated glove 10 includes a body 14 supporting a heating element 18 operable to heat at least a portion of a user's hand. The heating element 18 is coupled to and powered by a power source, such as a battery pack 22 (see FIGS. 9-11), supported by the glove 10. A garment controller or glove controller 26 (as shown in the illustrated embodiment) is configured to control the heating of the glove 10. In the illustrated construction, the glove controller 26 controls charging and discharging of the battery pack 22.

As shown in FIG. 2, the glove body 14 defines an interior 30 for receiving the user's hand. The body 14 has a first, palm side 34 (i.e., the side of the body 14 adjacent the palm of the hand) and an opposite second, back side 38 opposite the palm side 34. The body 14 defines one or more receptacles (e.g., five receptacles 42*a*-42*e* shown) for the digit(s) of a user's hand and has a wrist portion 46 to be positioned about the user's wrist. In other constructions (not shown), the body 14 defines the number of receptacles suitable for the construction of the garment—e.g., for a mitten (not shown), one receptacle for the user's thumb and a second receptacle for the user's fingers.

As shown in FIG. 1, a battery-receiving receptacle 50, configured to receive the battery pack 22, is positioned, in the illustrated construction, on the back side 38 of the wrist portion 46. It should be understood that, in other constructions (not shown), the receptacle 50 may be positioned in another location on the body 14. In a pair of gloves, each glove 10 includes a battery-receiving receptacle 50 such that each glove 10 supports the battery pack 22 for providing power to heat that glove 10.

In other constructions (not shown), the glove 10 may be powered by more than one battery pack 22. In such constructions, the glove 10 may include a receptacle arrangement to accommodate the battery packs 22 (e.g., a single receptacle (not shown) constructed to receive multiple battery packs 22, a separate receptacle 50 for each battery pack 22, etc.). In such constructions, the glove 10 may operate with fewer than the maximum number of battery packs 22 (e.g., a single operational battery pack 22 may power the glove 10 even with other battery pack(s) 22 being missing or disabled). The receptacle 50 and the battery pack 22 may be termed as a battery holder assembly that is removably coupled to the heated garment 10.

Figure 3:
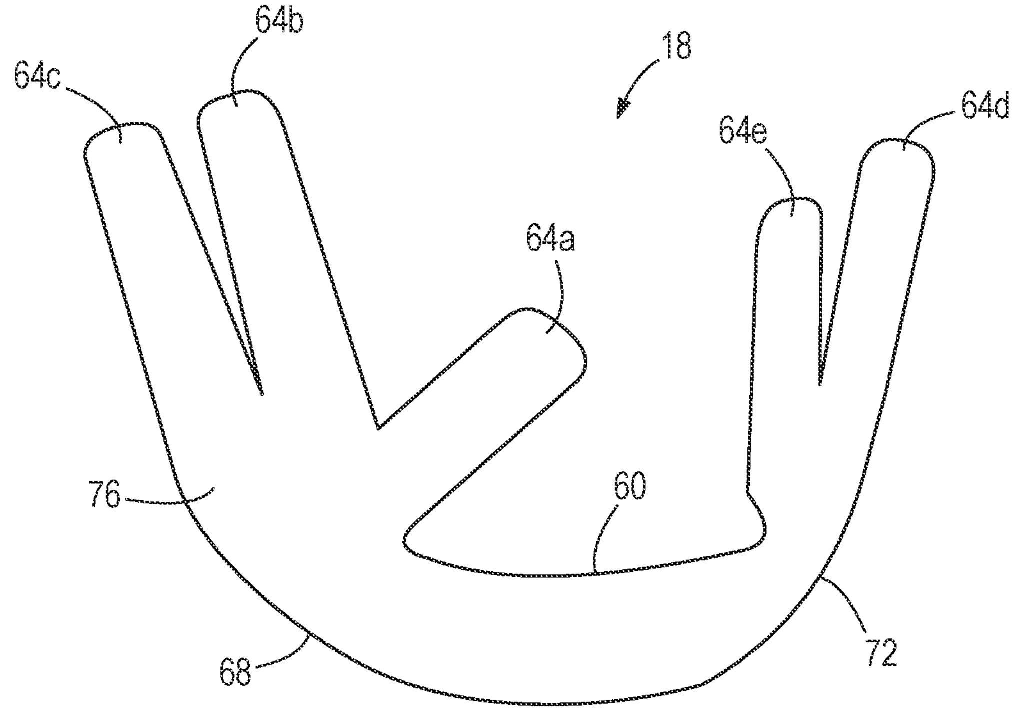
FIG. 3 is a plan view of the heating element shown in FIG. 1.

With reference to FIGS. 1-3, the illustrated heating element 18 includes a connecting portion 60 and a plurality of finger portions 64 in a heating element pattern. The connecting portion 60 includes a first end 68 and a second end 72 (FIG. 3). In the illustrated construction (see FIGS. 1-2), the connecting portion 60 is positioned on the palm side 34 of the wrist portion 46, and the connecting portion 60 has a length such that the first end 68 and the second end 72 are positioned on the back side 38 of the body 14. The connecting portion 60 is configured to heat (i.e., warm) the wrist of the user on the palm side 34.

With continued reference to FIGS. 1-3, finger portions 64 extend from each end 68, 72 of the connecting portion 60. The finger portions 64 are configured to correspond to the number of finger receptacles 42 of the body 14. The illustrated glove 10 includes five finger portions 64*a*-64*e* corresponding to the five finger receptacles 42*a*-42*e*.

In the illustrated construction (see FIGS. 1-3), the finger portions 64*a*-64*e* extend from the connecting portion 60 along the finger receptacles 42*a*-42*e* on the back side 38 of the body 14. In the illustrated embodiment, each finger portion 64*a*-64*e* extends from the connection portion 60 to an end of the respective finger receptacle 42*a*-42*e*. In other embodiments, the finger portions 64*a*-64*e* may extend only partially along the respective finger receptacle 42*a*-42*e*. The finger portions 64 are configured to heat (i.e., warm) each finger received in the finger receptacles 42 of the glove 10 on the back side 38.

As illustrated, the first, second, and third finger portions 64*a*, 64*b*, 64*c* (for the thumb, pointer finger and middle finger) extend from the first end 68 of the connection portion 60, and the fourth and fifth finger portions 64*d*, 64*e* (for the ring finger and pinkie finger) extend from the second end 72 of the connection portion 60. In other constructions (not shown), a different number of finger portions may extend from each end 68, 72.

In other constructions (not shown), the heating element 18 has a number of finger portions suitable for the garment type—e.g., a mitten (not shown) may have one finger portion for a user's thumb and a second finger portion for the user's fingers. In still other constructions, the heating element 18 may have the illustrated construction with five finger portions 64*a*-64*e* regardless of the construction of the garment (e.g., even for a mitten).

The heating element 18 includes a material 76 with fibers operable to conduct electricity and generate heat. The illustrated heating element 18 includes a metallic fiber material 76 having a base, such as, for example, carbon fiber, aluminum, stainless steel, etc., with a surrounding jacket. For example, the material 76 of the illustrated heating element 18 is formed by a stainless steel fiber (SSF) electrically conductive yarn. In one embodiment, the SSF yarn may include Carbon, Silicon, Manganese, Nickel, Chromium, Molybdenum, Nitrogen, Sulfur, Phosphorus, and Iron. In such embodiments, the SSF yarn may include, by percentage, 0.02% Carbon, 0.5% Silicon, 0.82% Manganese, 11.12% Nickel, 16.85% Chromium, 2.04% Molybdenum, 0.029% Nitrogen, 0.0005% Sulfur, 0.027% Phosphorus, and 68.56% Iron. Furthermore, the electrical conductivity may be 14 Ohms per Meter. In addition, the heating element 18 can have different power ratings. For example, the power of the illustrated heating element 18 is 5.5 Watts. In other embodiments, the power of the heating element 18 is 7.4 Watts.

Figure 4:
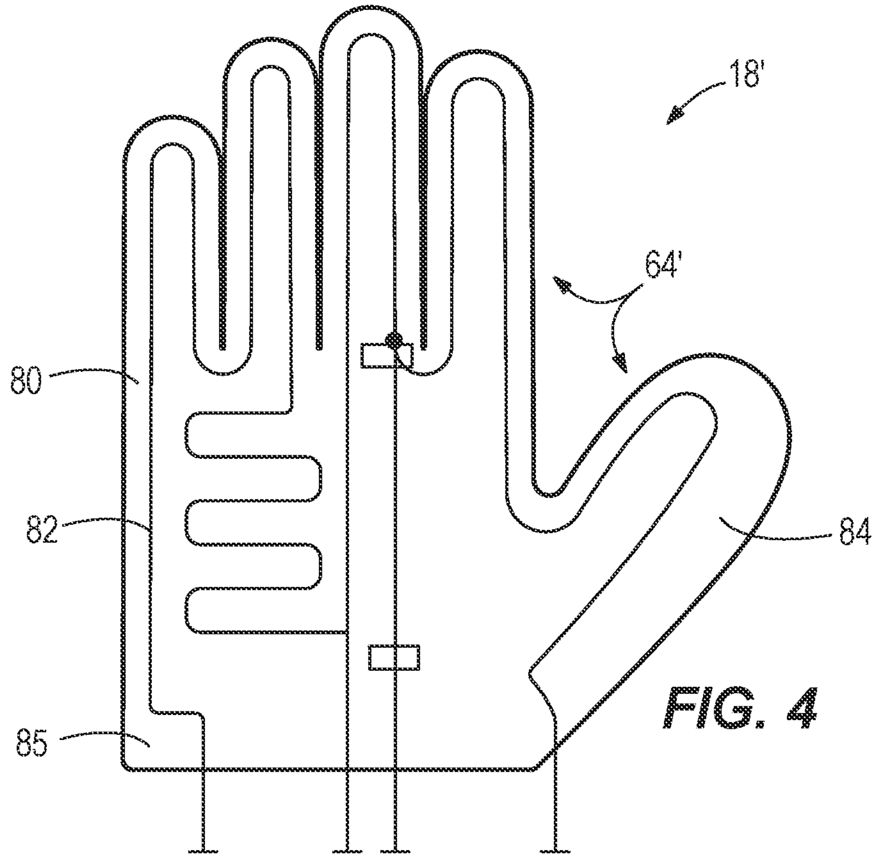
FIG. 4 is a plan view of an alternative construction of a heating element for a heated garment, such as a glove.

FIG. 4 illustrates an alternative construction of a heating element 18' with a different heating pattern. The heating element 18' includes a first heating portion 80 and a second heating portion 84 coupled to the first heating portion 80. The heating portions 80, 84 include a plurality of finger portions 64' operable to heat (i.e., warm) fingers of the user. Specifically, the illustrated first heating portion 80 is configured to heat (i.e., warm) the four fingers of a user and the illustrated second heating portion 84 is configured to heat (i.e., warm) the thumb of the user. The heating element 18' may be positioned on the back side 38 or the palm side 34 of the body 14'. The illustrated heating element 18' includes an electrical wire 82 extending along the back side 38 of an intermediate body 85. The intermediate body 85 may be positioned within or surround the body 14 of the glove 10 such that the wire 82 is configured to extend along each of the finger receptacles 42*a*-42*e* of the body 14. The illustrated wire 82 further extends across a portion of body 85 opposite a palm of the user's hand. The wire 82 may include a coating formed by rubber material, such as white polyvinyl chloride (PVC) insulation (having a maximum temperature range of 105° C. at 70P pressure rating). The wire 82 is electrically connected to the battery pack 22 for receiving power from the battery pack 22. In addition, similar to the glove 10 of FIG. 1, the battery pack 22 may be received in and supported by a battery-receiving receptacle 50 (not shown). The wire 82 may be connected to the controller 26 for controlling operation of the wire 26. In other embodiments, the wire 82 may extend along the intermediate body 85 in a different heating pattern (e.g., only across the finger portions 64', etc.).

Figure 5B:
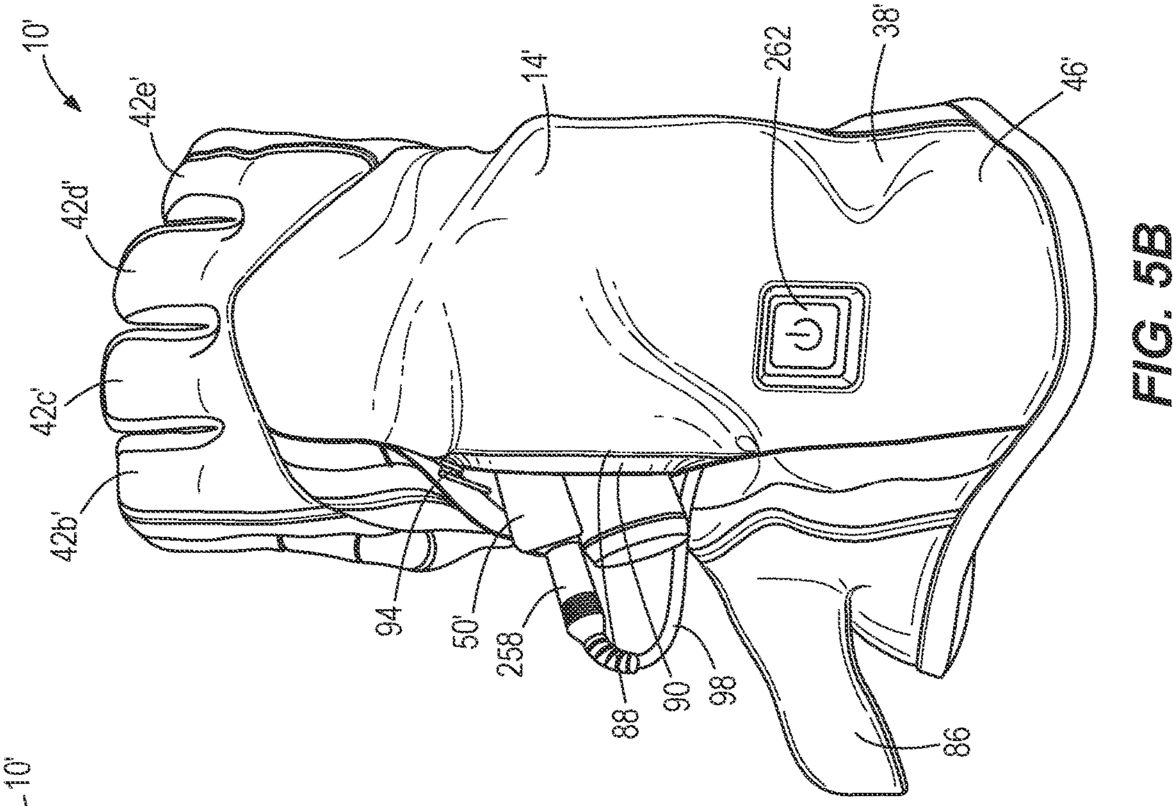
FIG. 5B is another perspective view of the heated garment of FIG. 5A, illustrating the receptacle in a second position in which the receptacle is partially received in the pocket.
Figure 5A:
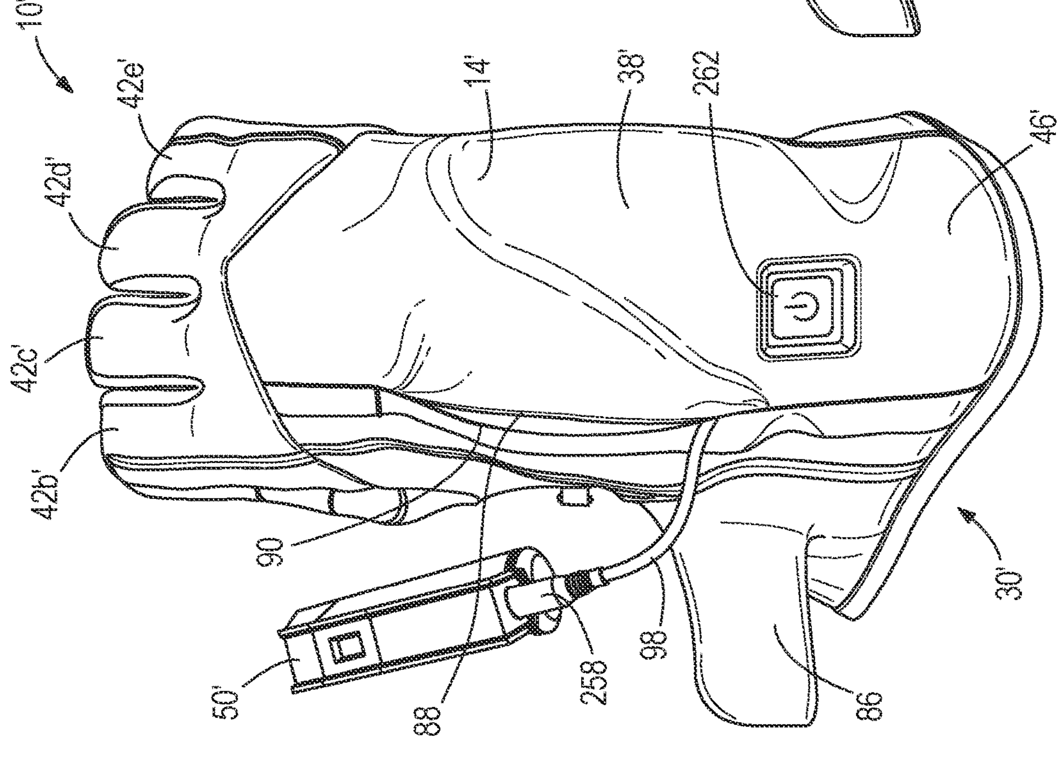
FIG. 5A is a perspective view of another alternative construction of a heated garment, such as a glove, illustrating a battery-receiving receptacle in a first position in which the receptacle is removed from a pocket of the heated garment.
Figure 5C:
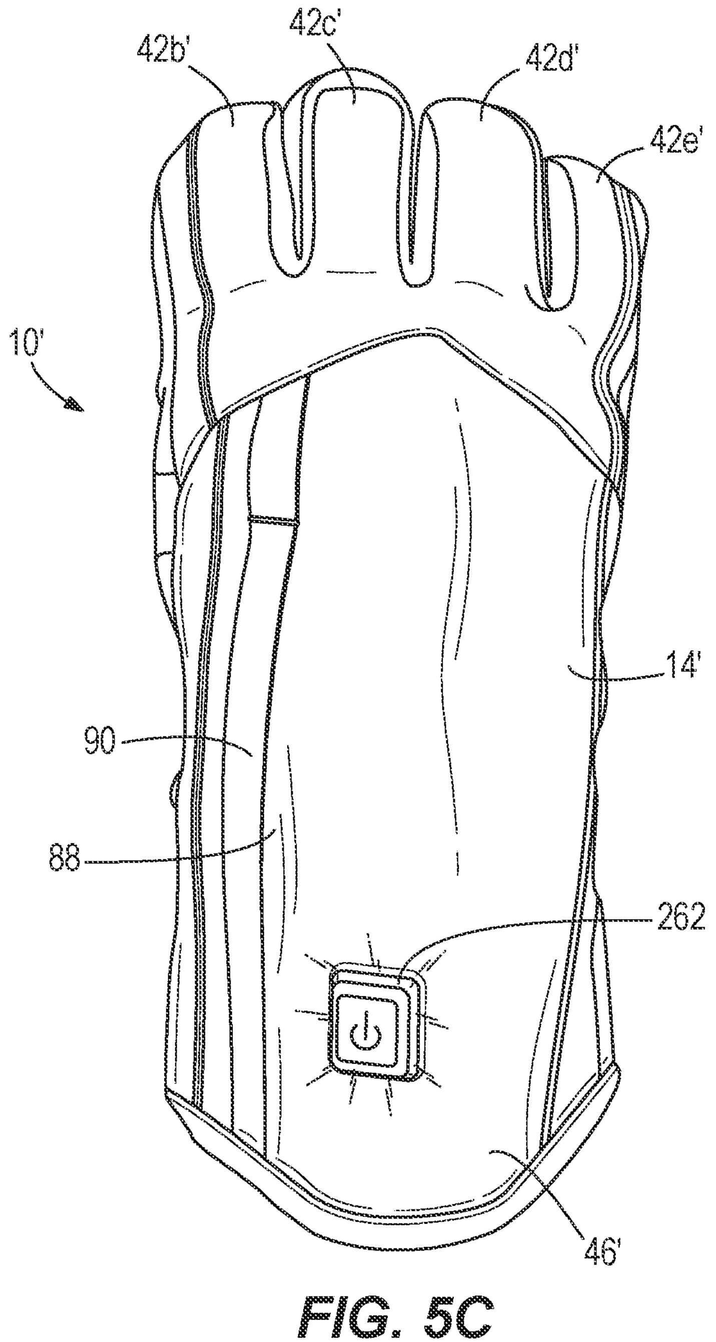
FIG. 5C is another perspective view of the heated garment of FIG. 5B, illustrating the receptacle in a third position in which the receptacle is completely received in the pocket.

FIGS. 5A-5C illustrate an alternative construction of the heated garment, such as a glove 10'. The illustrated glove 10' is similar to the hand garment 10 of FIGS. 1-2, and common elements have the same reference number plus a prime symbol (').

The illustrated glove 10' includes a strap 86 extending from the wrist portion 46'. The strap 86 may include a fastener (i.e., hook and loop fastener such as a Velcro® fastener) (FIG. 7) for selectively tightening or loosening the wrist portion 46' around the user's wrist.

In the illustrated construction, the receptacle 50' is removable from the glove body 14'. The glove body 14' includes (see FIG. 7) a pocket 88 configured to receive the receptacle 50' and the supported battery pack 22. The illustrated pocket 88 is positioned on a back side 38' of the wrist portion 46' and includes a slot 90 extending from the wrist portion 46' toward one of the receptacles 42*b*'. The illustrated slot 90 further includes a fastener (e.g., zipper 94) for selectively closing the pocket 88. In a pair of gloves, each glove 10' includes a pocket 88 such that each glove 10' supports a receptacle 50' and a supported battery pack 22 for providing power to heat that glove 10'.

Figure 6A:
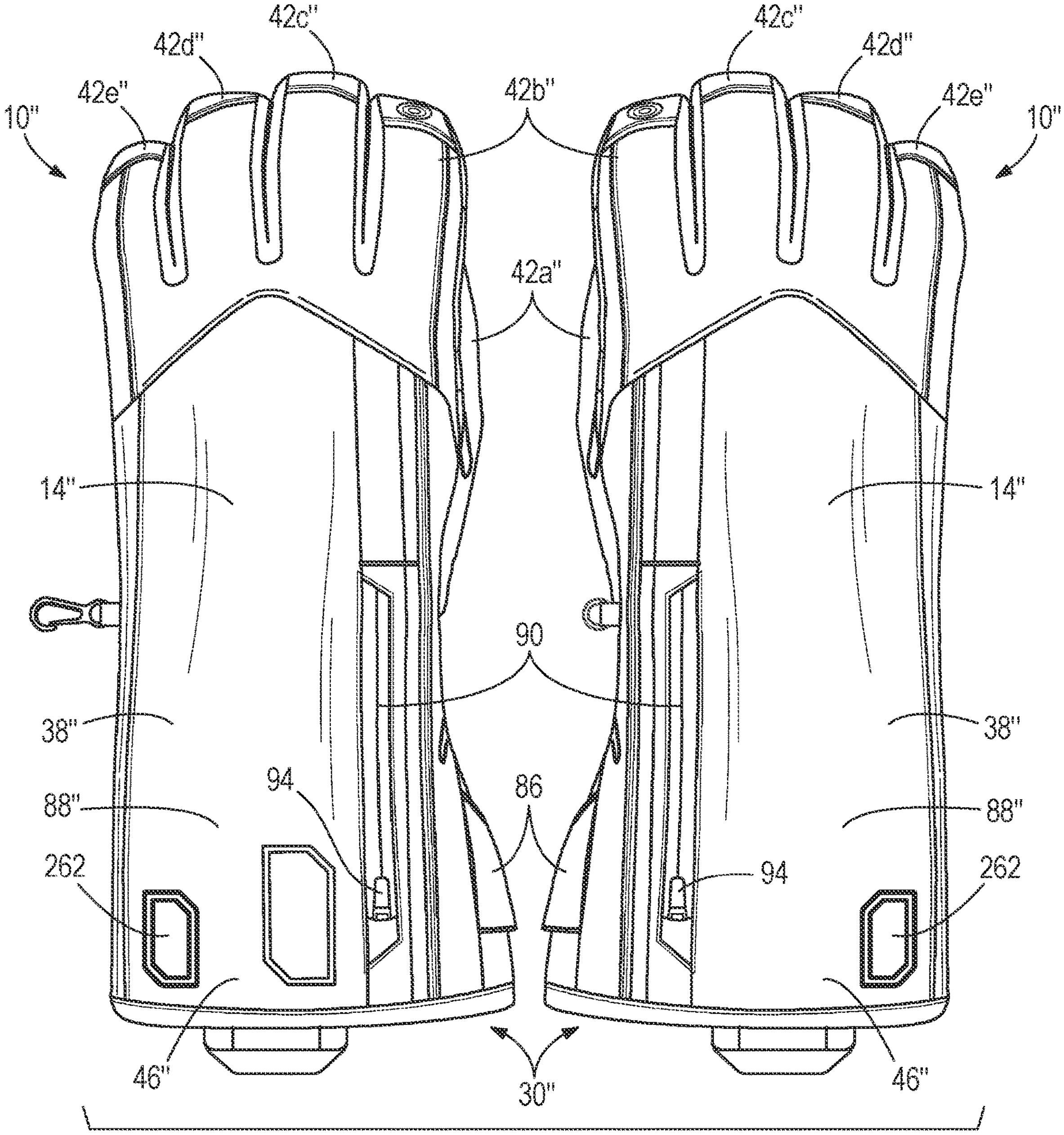
FIG. 6A is a top view of an alternative construction of a heated garment, such as a pair of gloves, illustrating a first side of the heated garment.
Figure 6B:
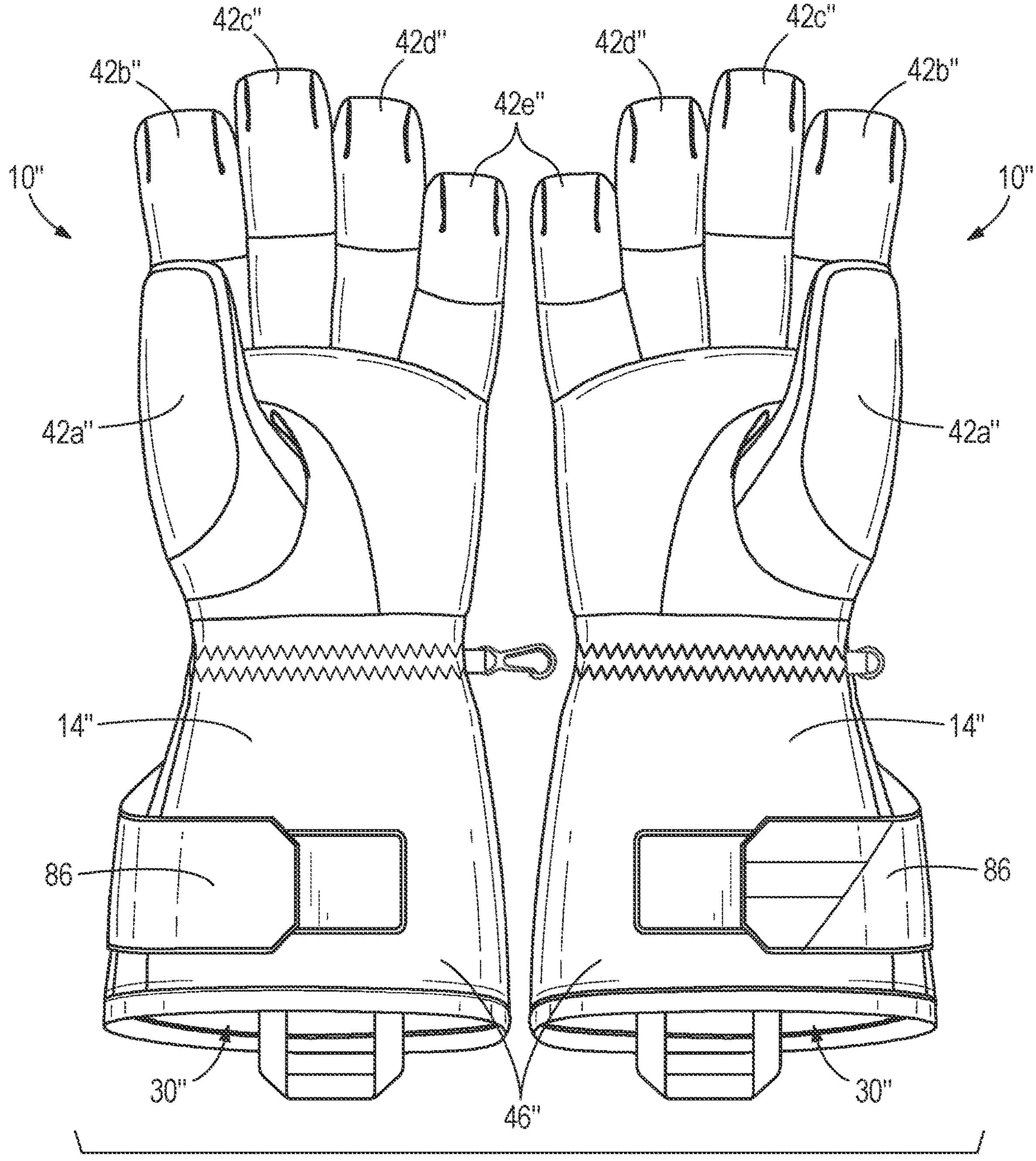
FIG. 6B is rear view of the heated garment of FIG. 6A, illustrating a second, opposite side of the heated garment of FIG. 6A.

FIGS. 6A-6B illustrate another alternative construction of the heated garment, such as a glove 10". The illustrated glove 10" is similar to the glove 10, 10' shown in FIGS. 1-2 and 5A-5C and described above, and common elements have the same reference number plus a double prime symbol (").

Figure 8:
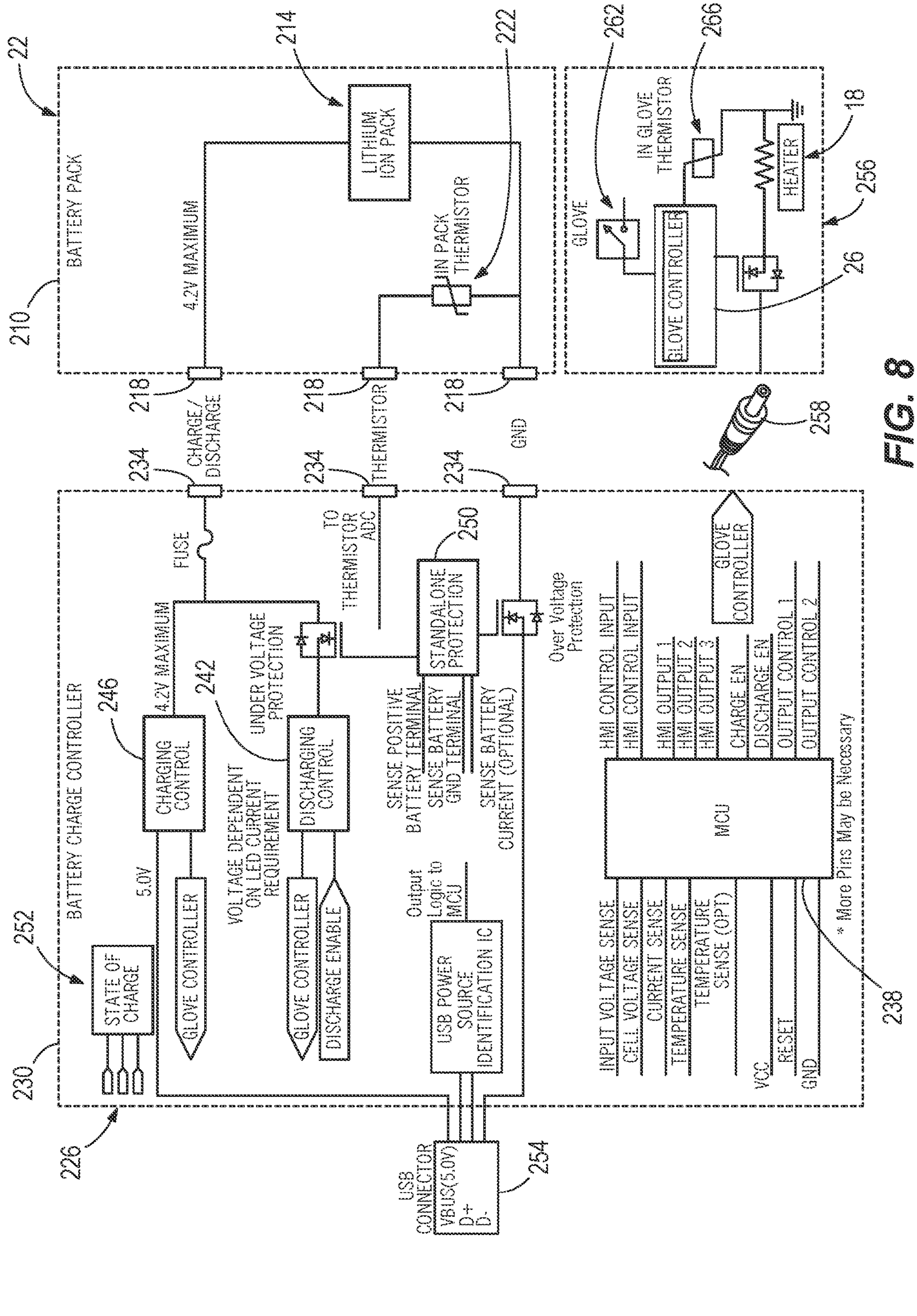
FIG. 8 is a block diagram of the glove shown in FIG. 1.

As schematically illustrated in FIG. 8, the battery pack 22 includes a pack housing 210 supporting one or more battery cells 214 (one in the illustrated construction). The illustrated battery cell 214 is a lithium-ion battery cell having a nominal voltage of about 3.6 V to about 4.4 V (e.g., about 4.2 V) and a capacity of between about 2.0 Amp-hours (Ah) and 5.0 Ah (e.g., about 3.0 Ah). In other constructions (not shown), the battery pack 22 may include more than one battery cell 214 connected in series, parallel or combination series-parallel. The nominal voltage of the battery pack 22 may be varied to meet the requirement of specific applications. In other constructions (not shown), the battery cell(s) may have a different chemistry, nominal voltage, capacity, etc.

Pack terminals 218 are supported on the housing 210 to electrically connect the cell(s) 214 to an electrical device, such as the glove 10, a battery charger, etc., for power transfer (e.g., a charge/discharge terminal and a ground terminal) and/or for communication. The battery pack 22 includes a temperature sensor (e.g., a thermistor 222) operable to sense a temperature of the battery pack 22 and/or of the cell(s) 214, and one of the terminals 218 is a communication terminal operable to communicate at least the sensed temperature to the electrical device. In some constructions, the battery pack 22 may also include a pack controller, and the communication terminal may communicate between the pack controller and the electrical device.

FIG. 8 also schematically illustrates a circuit 226 of the glove 10. At least a portion of the circuit 226 is supported by a housing 230 of the receptacle 50. The circuit 226 includes terminals 234 for connection to the pack terminals 218. In the illustrated construction, the terminals 234 include power terminals (e.g., a charge/discharge terminal and a ground terminal) and a communication terminal to receive information from the pack thermistor 222.

The circuit 226 also includes a master controller 238 including at least a memory configured to store software-based instructions and an electronic processor configured to execute the software. The controller 238 may, for example, be configured to, in addition to monitoring characteristics of the battery pack 22 (e.g., battery pack temperature (via electrical coupling with a thermistor), current, cell voltage, state of charge, etc.) and/or of the external power source (e.g., input voltage, current, etc.), etc., control charging and discharging protocols for the battery pack 22, identify when the circuit 226 is connected to an external power source, apply protection protocols for the battery pack 22/circuit 226.

The illustrated circuit 226 includes a discharging control 242 operated by the controller 238 to discharge the battery pack 22 and a charging control 246 operated by the controller 238 to charge the battery pack 22. In some constructions, the controller 238 may prevent simultaneous charging and discharging of battery pack 22.

Protection circuitry 250 is operated by the controller 238 to perform protection protocols which may include terminating charging or discharging of the battery pack 22 based on monitored characteristics (e.g., pack temperature reaching a temperature threshold value, cell voltage reaching a voltage threshold value, etc.). The protection protocols may include protecting against short circuits in the electrical wiring, cables, etc. (e.g., the wiring of the heating element 18, the connecting wire/cable 98, etc.) of the glove 10.

In addition, the controller 238 may be configured to activate one or more indicators 252 (e.g., LEDs, etc.) to indicate an operational state of the battery pack 22 (e.g., a charge level), of the circuit 226 (e.g., whether charging is occurring), of the glove 10 (e.g., whether heating is occurring, a selected heating mode, etc.), etc.

As mentioned above, the battery pack 22 may also include, for example, a pack controller (not shown) including at least a memory configured to store software-based instructions and an electronic processor configured to execute the software, that is configured to accomplish one or more of the functions described above (e.g., charging/discharging control, protection, etc.) in cooperation with or independently of the controller 238 of the circuit 226. In such constructions (not shown), the communication terminal 234 may facilitate communication with a pack controller.

As illustrated, external power is provided to the circuit 226 through the power inlet 254 (e.g., a USB-B micro connector) to provide charging current to charge the battery pack 22 via the charging control 246. In some embodiments, the power connector may include a Y-cable (not shown) for simultaneous connection to the receptacle 50 of each glove 10 to charge the battery pack 22 of each glove 10 simultaneously.

A glove circuit portion 256 may be connected to the portion of the circuit 226 supported by the receptacle 50 by a connector plug 258. The glove circuit portion 256 includes the heating element 18 and the glove controller 26. The glove controller 26 includes at least a memory configured to store software-based instructions and an electronic processor configured to execute the software. The glove controller 26 may, for example, be configured to control operation of the heating element 18, to monitor characteristics of the glove 10 (e.g., temperature, etc.), etc. During operation, power from the battery controller 238 is delivered to the glove controller 26 with at least about 95% efficiency (e.g., about 99% efficiency).

Figure 7:
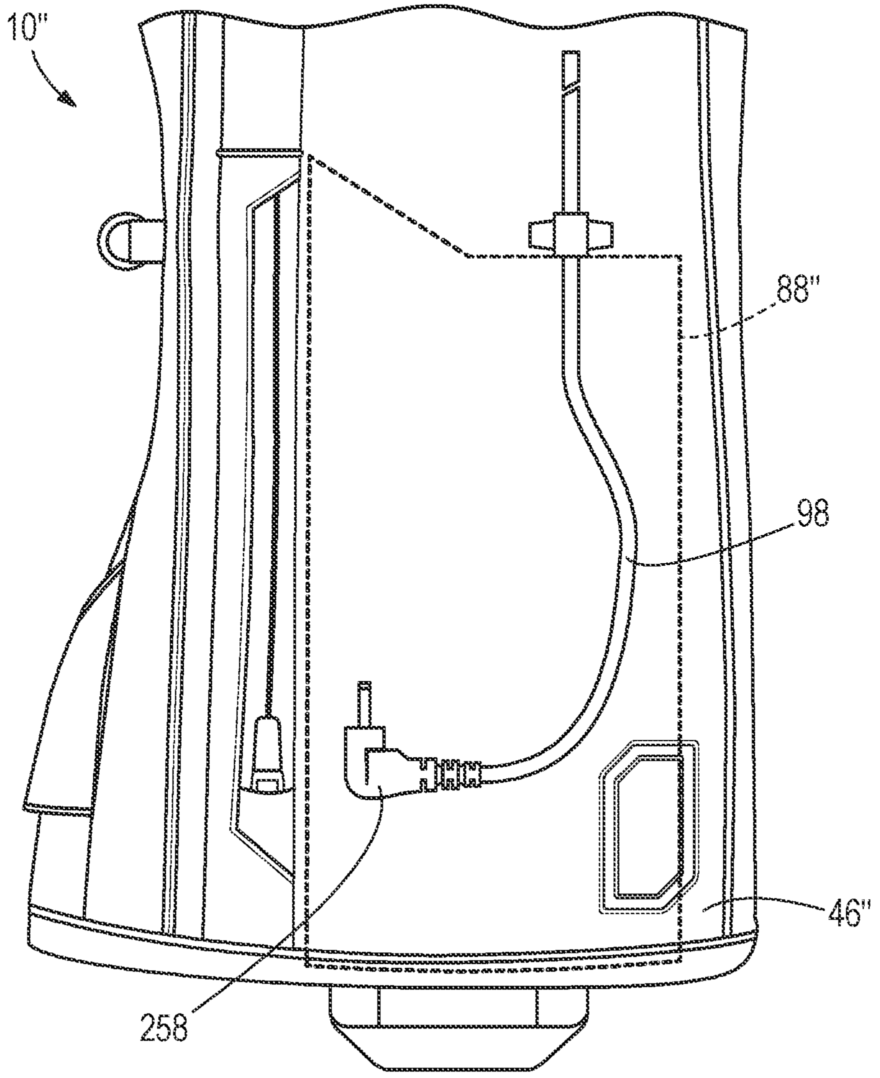
FIG. 7 is an enlarged top view of a portion of the hand garment of FIG. 6A including a connector plug.

As shown in FIGS. 5A-5B, 6A-6B and 7, the connector plug 258', 258" includes the flexible wire/cable 98 extending from the pocket 88, 88" to connect the battery controller 50', 50" (along with the battery pack 22) to the glove circuit portion 256 of the glove 10', 10". To connect to the glove circuit portion, 256, the user opens the pocket 88, 88" to access the plug connector 258 (FIG. 5A), and the receptacle 50', 50" (along with the supported battery pack 22) is connected by the connector plug 258, 258" (FIG. 5B). The user then positions the receptacle 50', 50" in and closes the pocket 88, 88" (FIGS. 5C and 7).

An actuator 262 (e.g., a button, a switch, a trigger, etc.) is engageable by a user to actuate (e.g., turn ON, turn OFF, select a heating mode or level, etc.) for the heating element 18. The actuator 262 may include a single button communicating with the glove controller 26 of the associated glove 10 to switch ON, OFF, and between a number of (e.g., three) heating levels of the heating element 18 and corresponding discharge levels of the battery pack 22. Discharge current runs from the battery pack 22 through the circuit 226 to the heating element 18.

As shown in FIGS. 5A-5C, the glove body 14' supports the actuator 262' (e.g., a button, a switch, a trigger, etc.), and the actuator 262' is a component of the glove circuit portion 256. The illustrated button 262' has a generally square shape and projects from the back side 38' of the wrist portion 46'. The button 262' is proximate the slot 90. As shown in FIGS. 6A-6B, the illustrated button 262" has a generally rectangular shape and is positioned on the opposite side of the back side 38" of the wrist portion 46" from the slot 90.

Features of the actuator 262, 262', 262" may be similar to the control button described and illustrated in U.S. Design Pat. No. D808,616, issued Jan. 30, 2018; in U.S. Design patent application Ser. No. 29/634,970, filed Jan. 26, 2018; or in U.S. Patent Application Publication No. US 2016/0128393, published May 12, 2016, the entire contents of all of which are hereby incorporated by references.

A temperature sensor (e.g., a thermistor 266) on the glove body 14 is operable to sense a temperature of the glove 10 and to communicate the sensed temperature to the glove controller 26. The glove controller 26 is operable to control heating to the selected heating level with feedback from the thermistor 266.

Figure 9A:
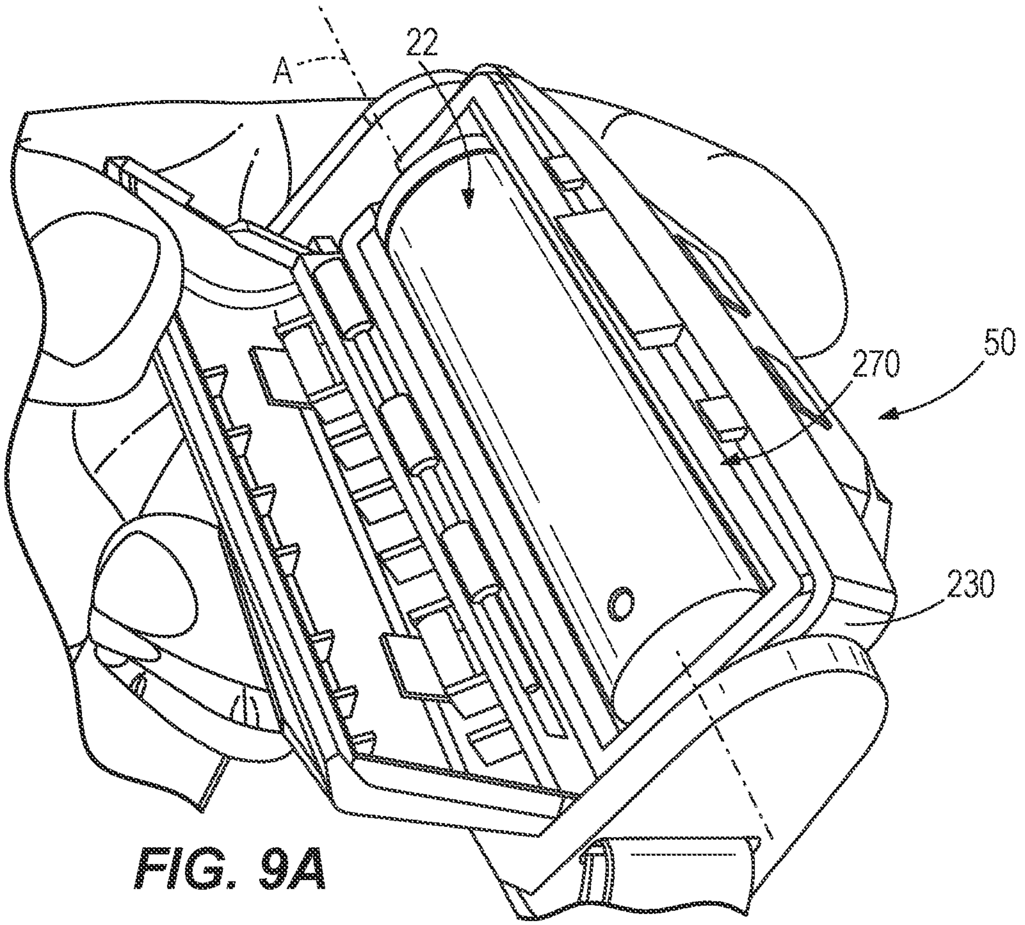
FIG. 9A is a perspective view of a battery-receiving receptacle and a battery pack for use with the glove of FIG. 1, illustrating the battery pack received in the receptacle.
Figure 9B:
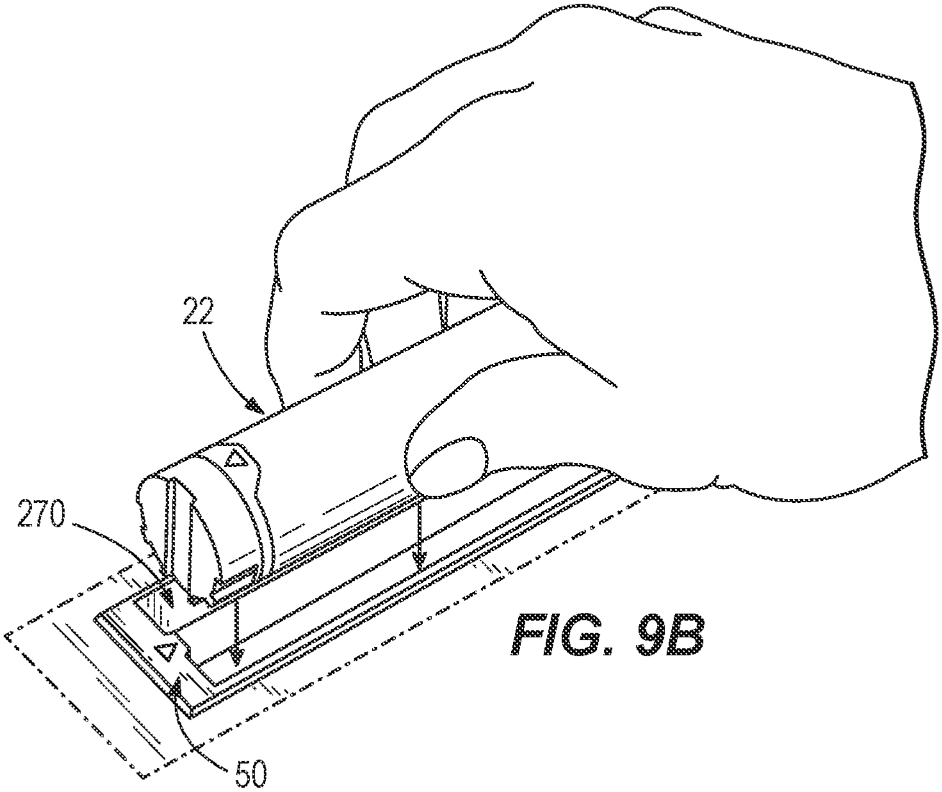
FIG. 9B is perspective view of the battery pack and a portion of the battery-receiving receptacle of FIG. 9A, the other portions of the battery-receiving receptacle removed for clarity, illustrating the battery pack being received in a first radial direction of the battery-receiving receptacle.
Figure 10A:
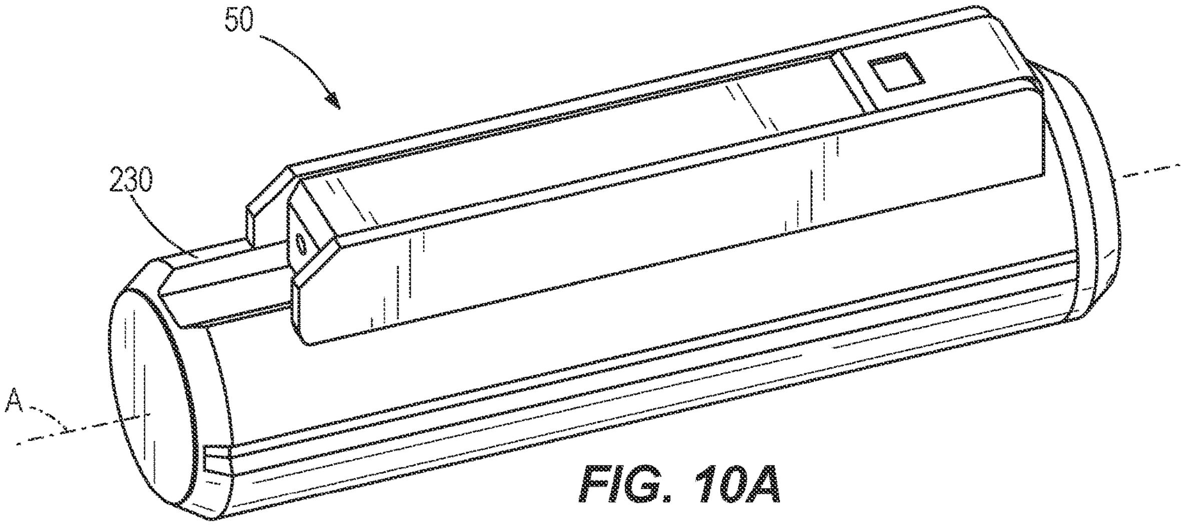
FIG. 10A is a perspective view of an alternative construction of the batter-receiving receptacle for the glove of FIG. 1.
Figure 10B:
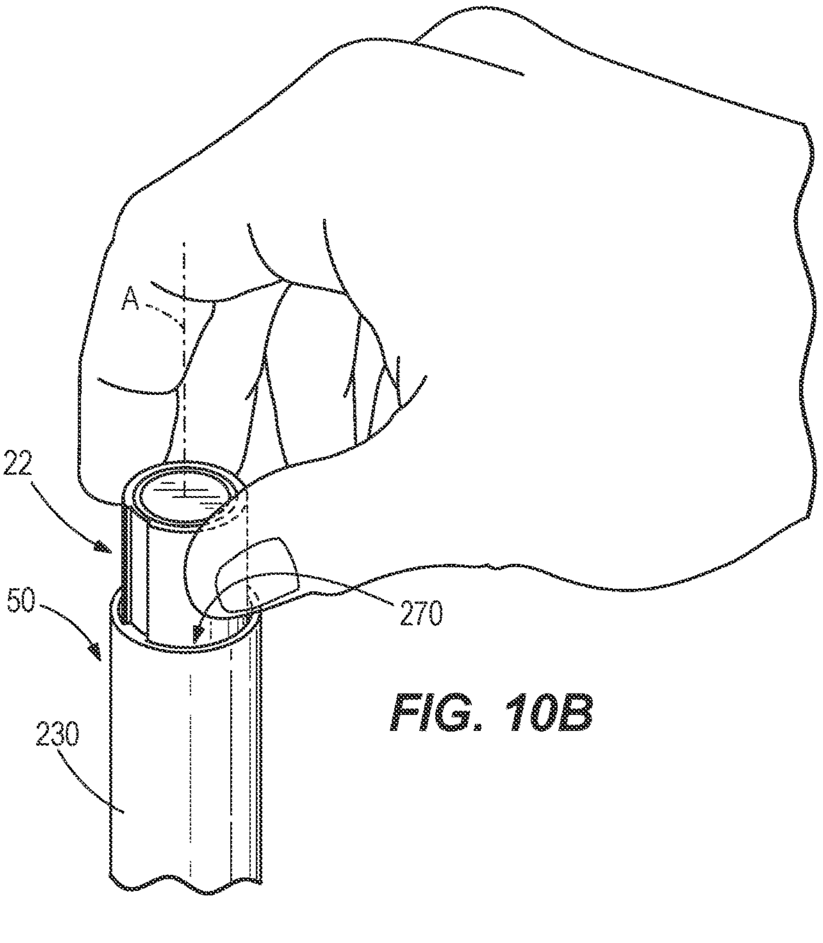
FIG. 10B is a perspective view of the battery-receiving receptacle of FIG. 10A and a battery pack, illustrating the battery pack being received in a different, second, axial direction of the battery-receiving receptacle.

FIGS. 9A-9B illustrate one construction of the receptacle 50 in which the housing 230 of the receptacle 50 defines a cavity 270 for removably receiving the battery pack 22. The cavity extends along a longitudinal axis A of the cavity 270. With respect to FIGS. 9A-9B, the battery pack 22 is received in the cavity 270 in a direction transverse to the longitudinal axis A. FIGS. 10A-10B illustrate an alternative construction of the receptacle 50 in which the cavity 270 receives the battery pack 22 in an axial direction along the longitudinal axis A. The circuit terminals 234 are supported in the cavity 270 to engage the pack terminals 218 for transfer of power with the cell(s) 214 and/or signals with the pack 22.

The receptacle 50 allows a battery pack (such as the battery pack 22) to be securely retained within the cavity 270 to ensure the terminals 218, 234 remain engaged when the battery pack 22 is received by/locked into the receptacle 50. The construction of the receptacle 50 provides enhanced durability for both the receptacle 50 and the associated battery pack 22 as the enclosed locking design of the receptacle 50 protects the battery pack 22 and the supported portion of the circuit 226 in the closed, locked configuration during storage and/or transport.

In the illustrated construction, the receptacle 50, along with the battery pack 22 if installed, is removable from the glove body 14, and the portion of the circuit 226 supported by the housing 230 (including the main controller 238) is connectable to the glove circuit portion 256 (and the glove controller 26, the heating element 18, etc.) by the connector plug 258. The illustrated receptacle 50 is operable separate from the glove 10 to, for example, charge the battery pack 22, power another electrical device (not shown), etc.

Figure 11:
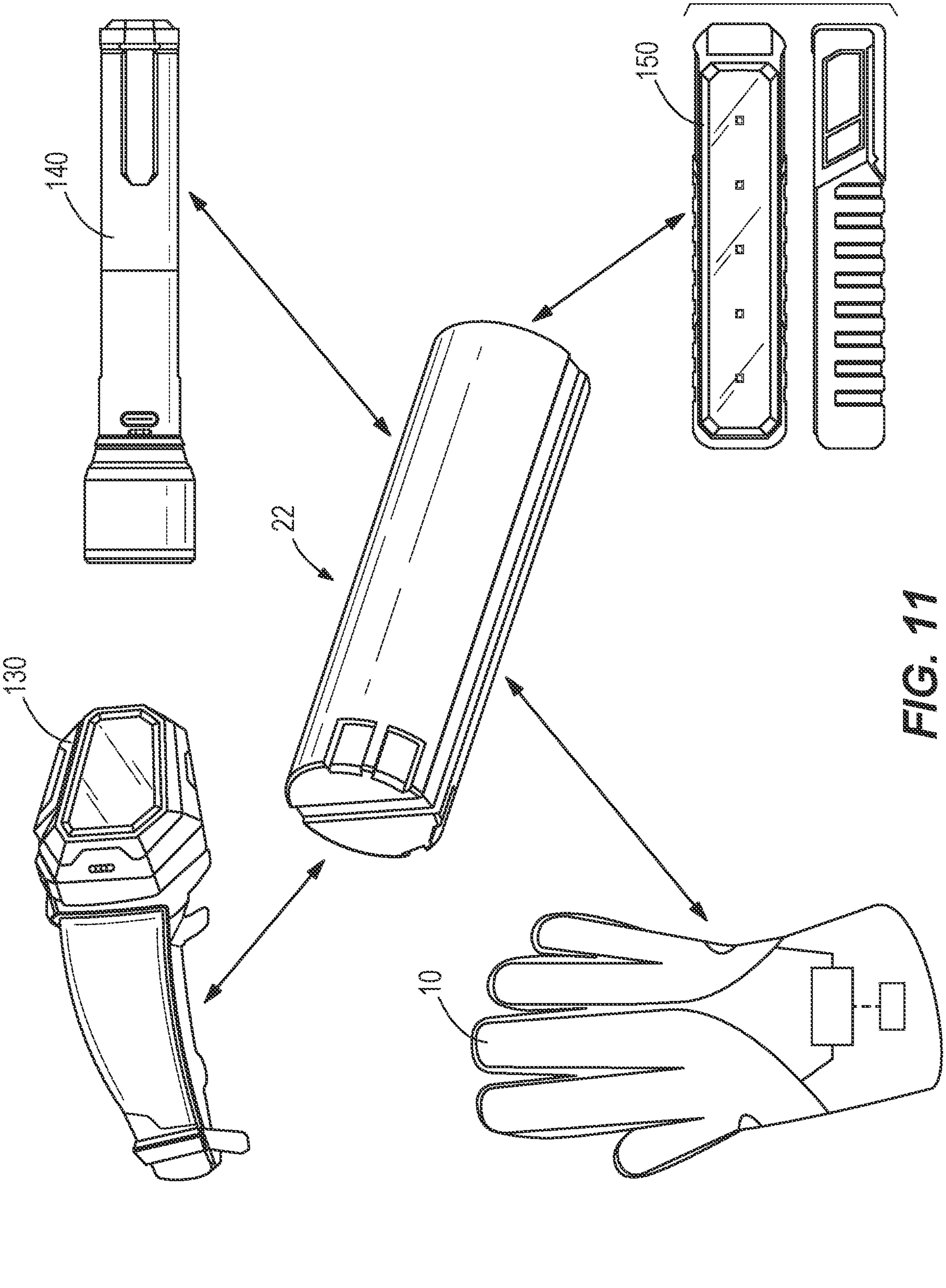
FIG. 11 illustrates the battery pack and a plurality of electrically-powered devices with which the battery pack is configured to be used including the glove shown in FIG. 1.

FIG. 11 illustrates the battery pack 22 and a number of exemplary electronic devices configured to receive the battery pack 22. The illustrated electronic devices include a headlamp 130, a flashlight 140, a flood light 150 and the heated glove 10. However, it should be noted that the battery pack 22 may be used with a variety of electronic devices including, for example, non-motorized devices, such as lighting devices, cameras (e.g., an inspection scope, etc.), audio devices (e.g., headphones, speakers, etc.), etc., and motorized devices such as power tools (e.g., a screwdriver, a drill, etc.), vacuums, fans, etc.

The battery pack 22 is configured to be used with multiple electrical devices having a receiving port or cavity configured to facilitate guided insertion of the battery pack 22 in a radial direction or in an axial direction. In addition, engagement between an insertion alignment member on the electrical device and an alignment member on the battery pack 22 ensures that only battery packs 22 configured to be used with the electronic devices are properly received and used by the electrical device (e.g., the receptacle 50). This prevents battery packs that may be inoperable with the electrical device or that may damage the electrical device from being used (e.g., an electromechanical "lock-out" feature).

A similar battery pack 22 and receptacle 50 may be described and illustrated in PCT Patent Application Publication No. WO 2018/068325, published Apr. 19, 2018, or in U.S. patent application Ser. No. 15/939,765, filed Mar. 29, 2018, the entire contents of both of which are hereby incorporated by reference.

Figure 12:
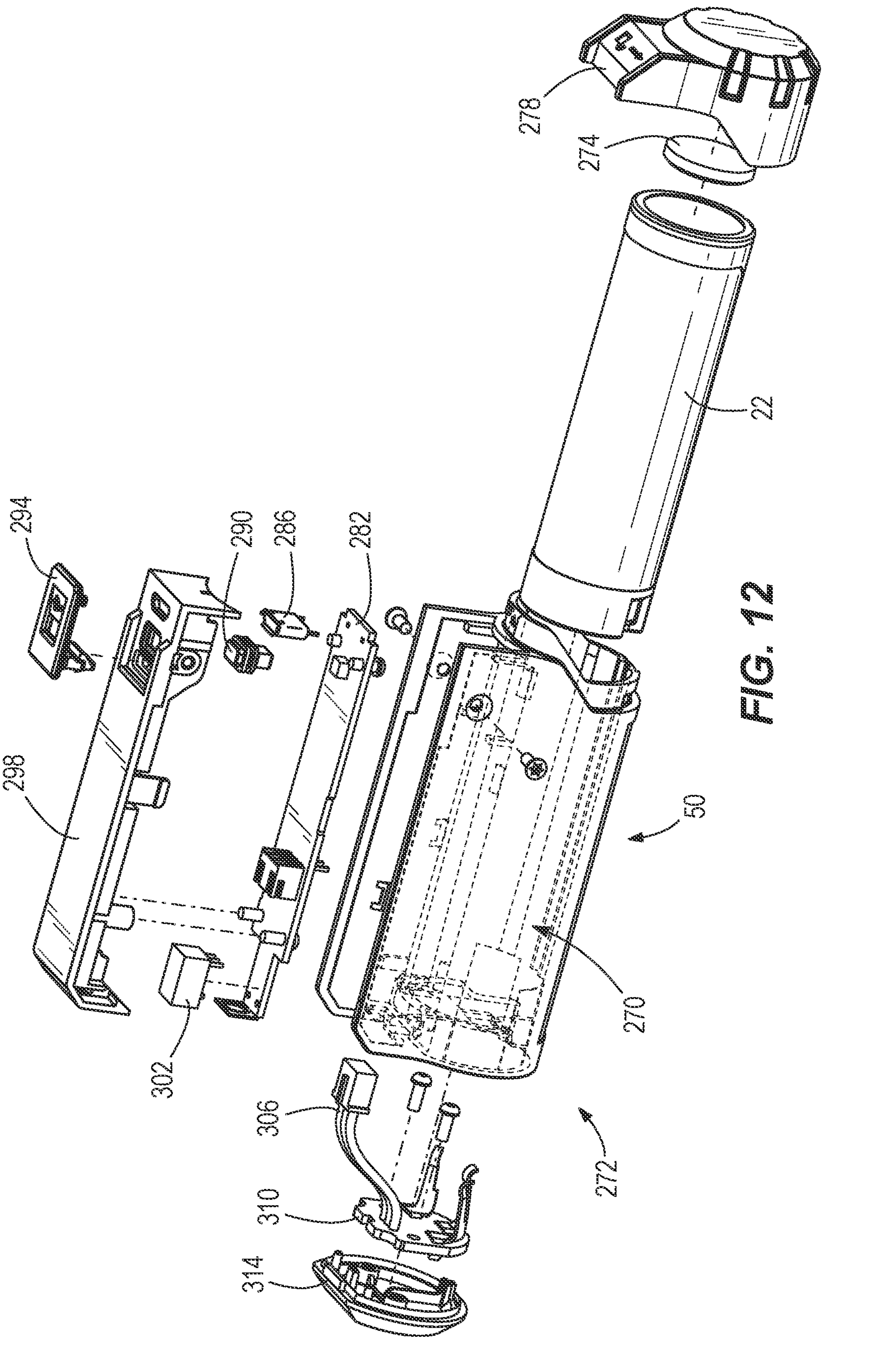
FIG. 12 is an exploded view of a battery-receiving receptacle.

FIG. 12 illustrates an exploded view of the receptacle 50 for housing the battery pack 22. The receptacle 50 includes a housing 272, defining the battery cavity 270, a spring clip 274 and a cap 278. The spring clip 274 biases the battery pack 22 inwardly, and the cap 278 is operable to close and retain the battery pack 22 in the cavity 270.

A main PCB 282 includes circuitry for controlling operation of the battery pack 22, as well as a Universal Serial Bus (USB) port 286, a charger indicator light 290, and a DC port 302. The USB port 286 is an input port for receiving a DC current (e.g., through a USB cable 304) to charge the supported battery pack 22.

The light 290 is an indicator to communicate to the user an operational status (e.g., when the battery pack 22 is being charged). The DC port 302 provides DC power output from the battery pack 22 to an external device (e.g., through the connector plug 258 to allow current flow to the glove controller 26 and to the heating element 18). The DC port 302, the USB port 286, the indicator light 290, and the main PCB 282 are all protected by a PCB cover 298 and a USB cover 294. A pigtail and connector 306 and a terminal block 310 connect the battery pack 22 and associated circuitry to the main PCB 282 and are protected by a terminal cap 314.

Figure 13:
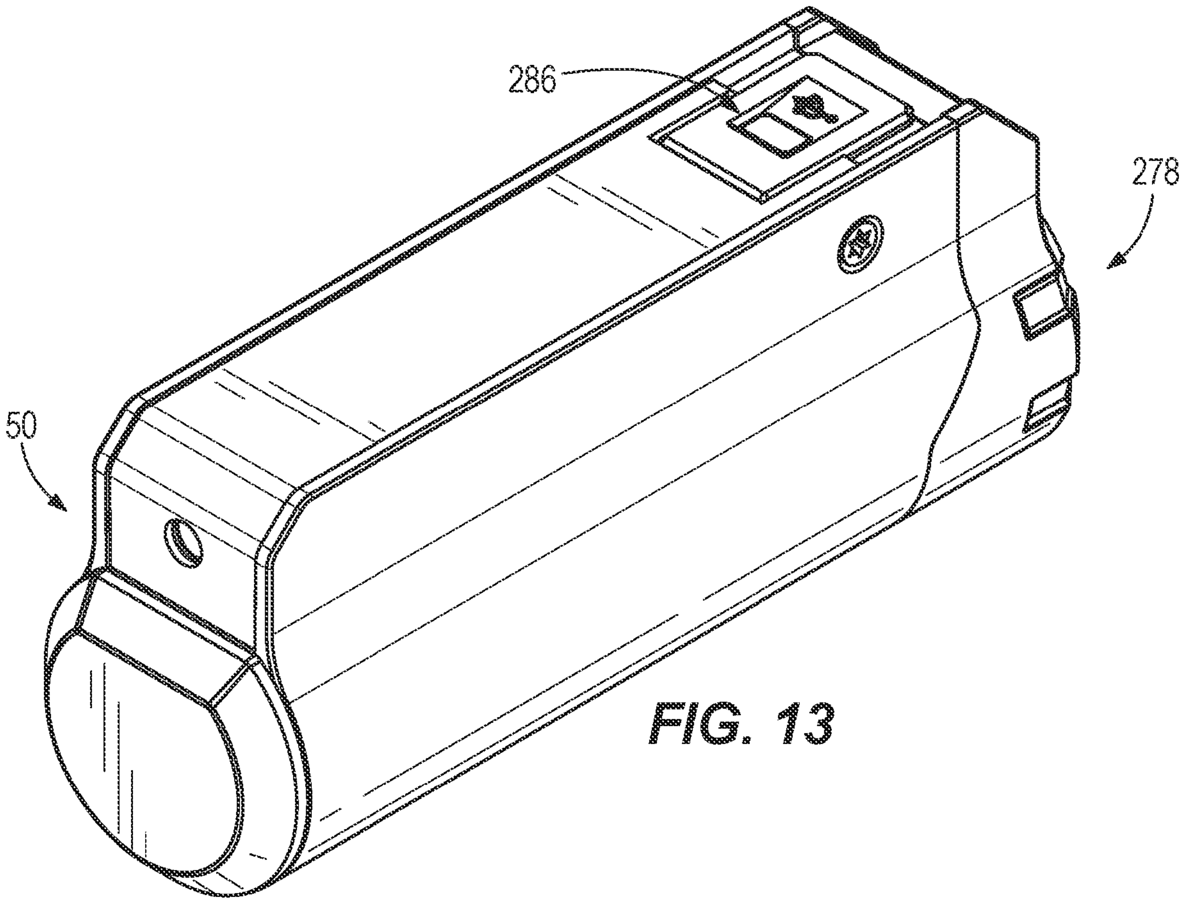
FIG. 13 is a perspective view of the battery-receiving receptacle.
Figure 14:
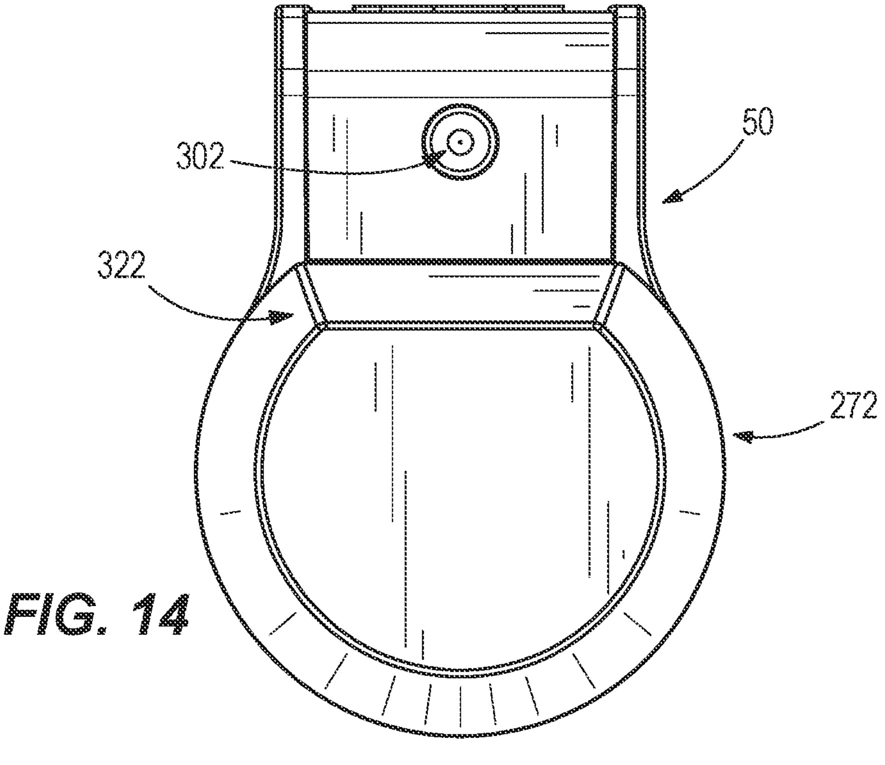
FIG. 14 is an end view of the battery-receiving receptacle.

FIGS. 13-16 illustrate a third alternative construction of the receptacle 50. As shown in FIG. 13, the top of the housing 272 includes the USB port 286. FIG. 14 illustrates the back of the controller housing 272, which includes the DC port 302. As shown in FIG. 14, the housing 272 is constructed (e.g., with broad chamfers 322) to facilitate insertion of the receptacle 50 into the pocket 88.

Figure 15:
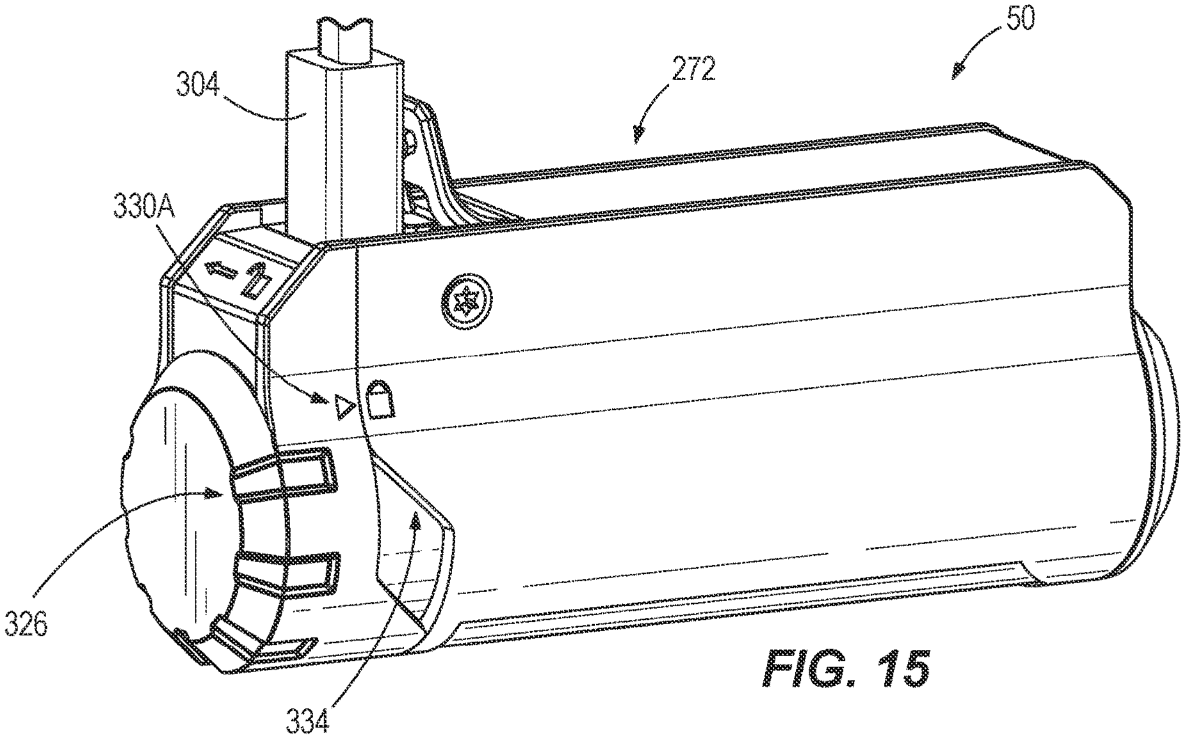
FIG. 15 is a side perspective view of the battery-receiving receptacle, illustrating the locking mechanism in a locked condition.
Figure 16A:
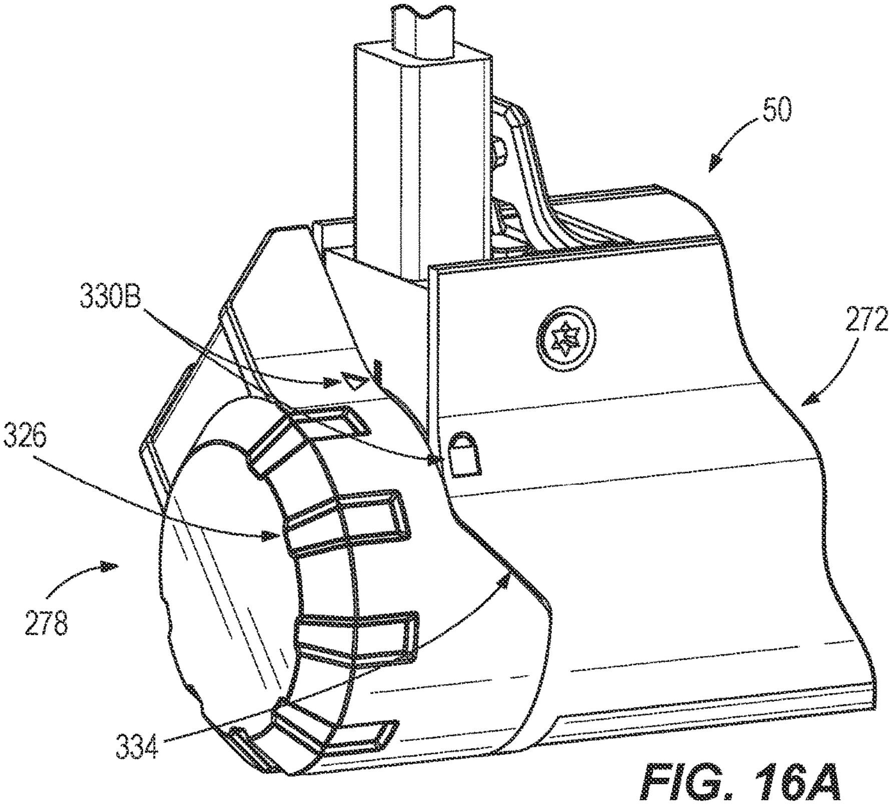
FIG. 16A is a perspective view of a locking mechanism of the battery-receiving receptacle of FIG. 9A, illustrating the locking mechanism in an unlocked configuration.
Figure 16B:
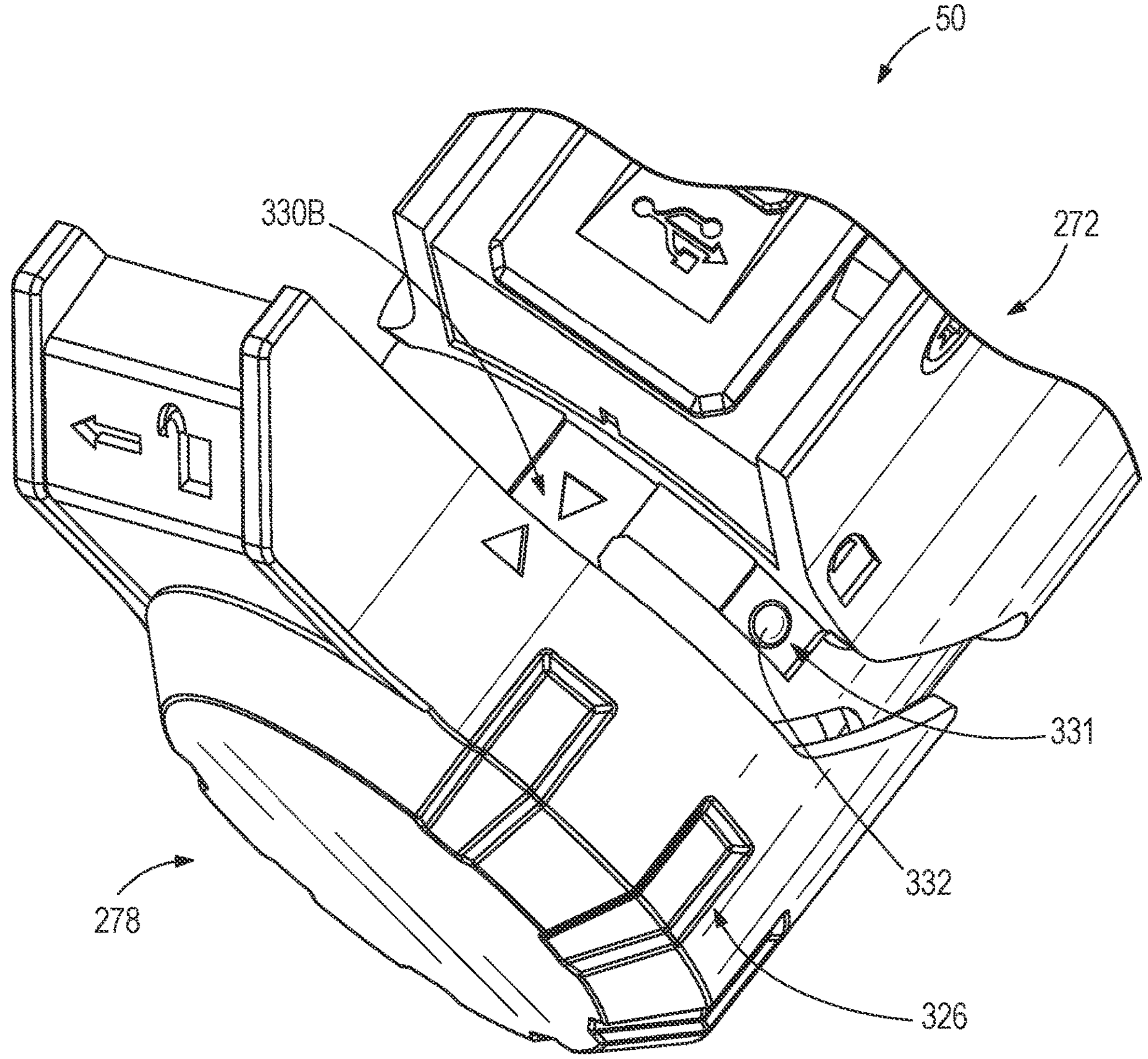
FIG. 16B is an enlarged perspective view of the locking mechanism of FIG. 16A.

FIGS. 15-16 illustrate a locking mechanism 330 for the receptacle 50. The locking mechanism 330 is operable between a locked position, in which cooperating locking members (partially shown in FIG. 16B; e.g., a projection (not shown) engageable in a recess 331) on the cap 278 and the housing 272 engage to retain the battery pack 22 in the cavity 270, and an unlocked position, in which the locking members are disengaged to allow removal or insertion of a battery pack 22. The locked position (see FIG. 15) is indicated by alignment of indicators 330A. In the unlocked condition (see FIG. 16A-16B), the indicators 330A are misaligned, and the indicators 330B are aligned. A detent mechanism 332 (partially shown in FIG. 16B) selectively retains and provides feedback of the cap 278 in the locked position.

The cap 278 includes gripping members 326 to facilitate movement between the locked and unlocked positions. The housing 272 and the cap 278 define a stepped interface 334, to show how the cap 278 fits onto housing 272.

Figure 17:
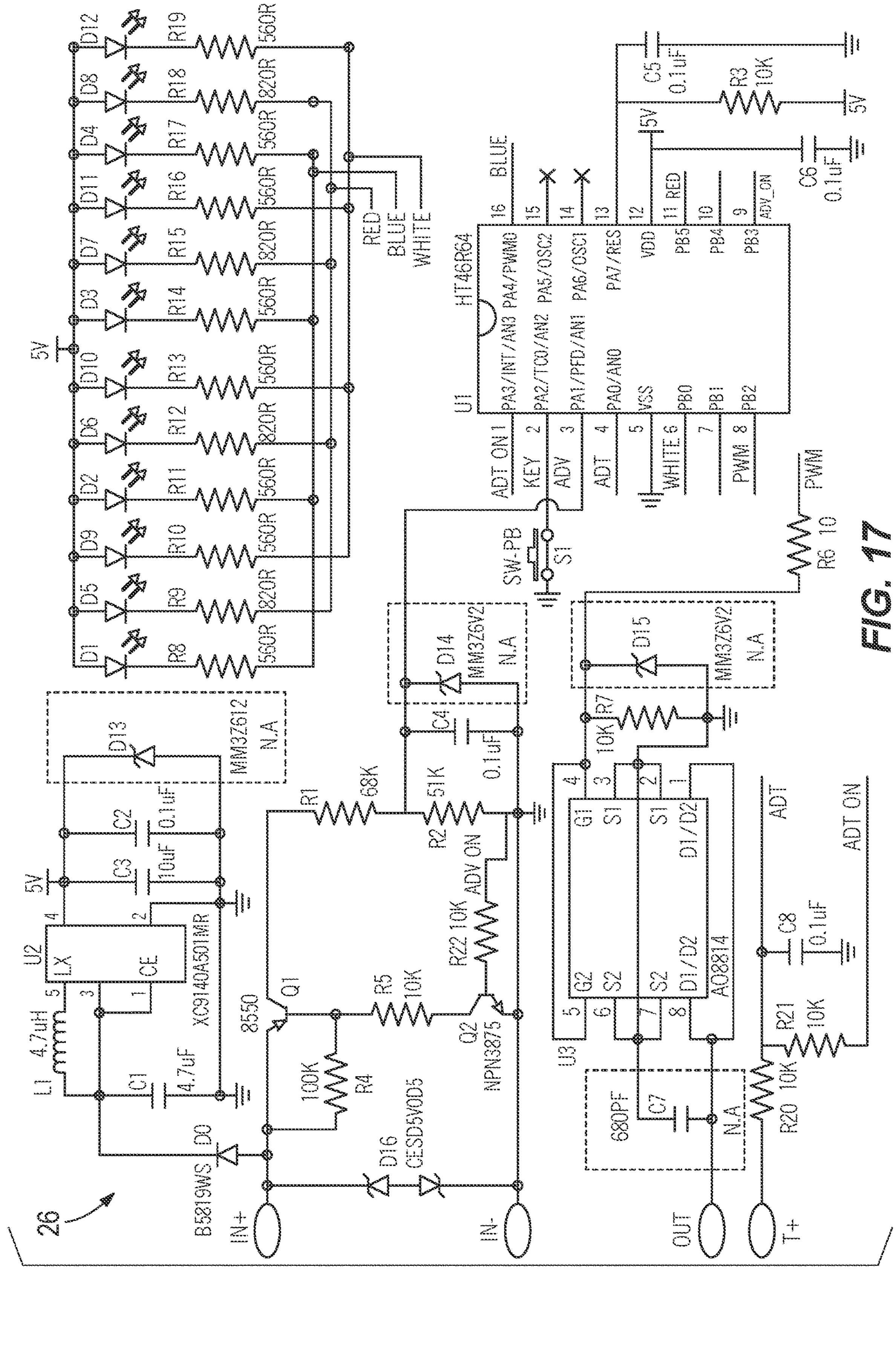
FIG. 17 is an electrical diagram of the garment controller.
Figure 18:
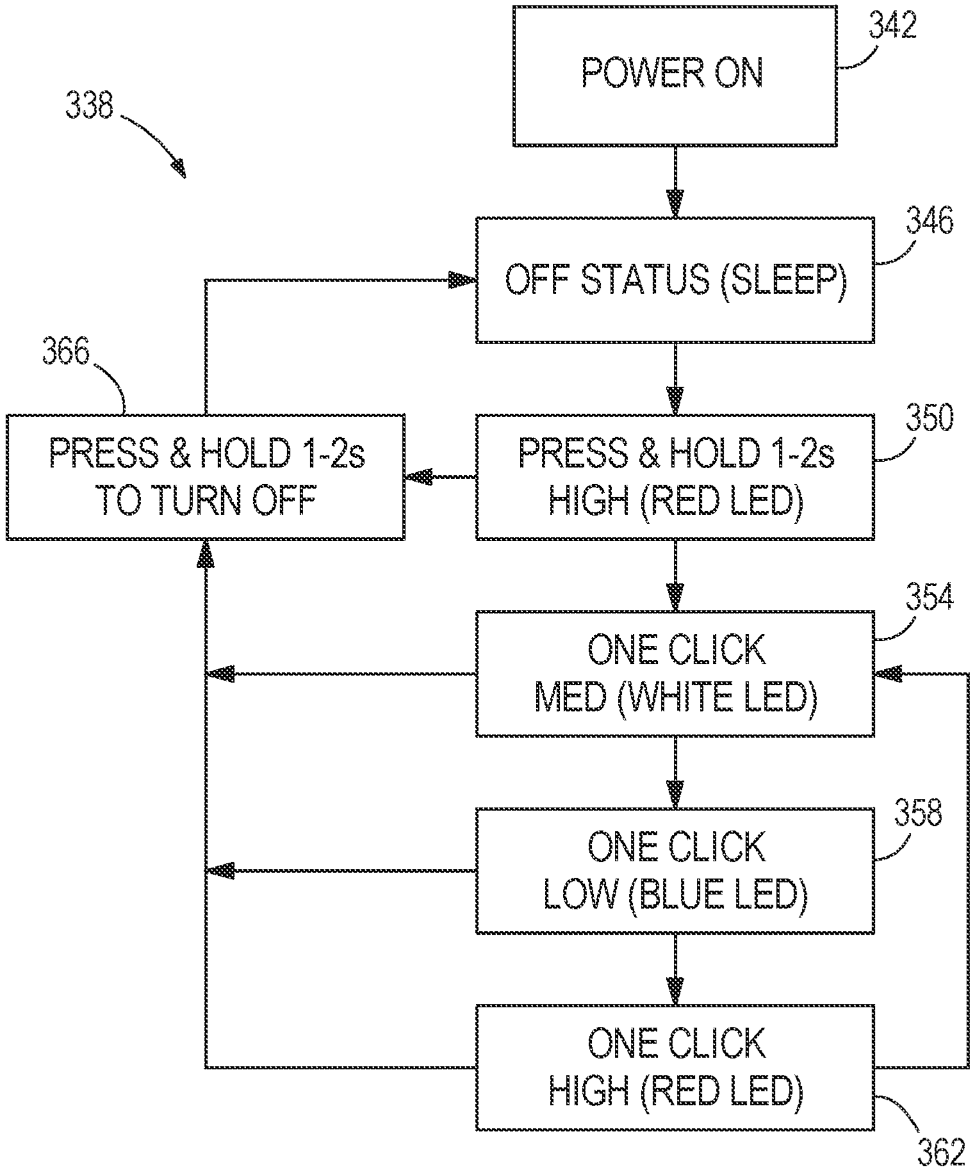
FIG. 18 is a flowchart illustrating operation of the actuator for the heated garment.

FIG. 17 is an electrical diagram of the glove controller 26. The controller 26 may control operation of the glove 10 in accordance with the method 338 shown in FIG. 18. In FIG. 18, a power on step 342 occurs when there is a sufficient power level in the battery pack 22 to provide current to the heating element 18. The controller 26 starts the heating element 18 in an off state 346, in which no current is provided from the battery pack 22.

If the actuator 262 is actuated to begin heating (e.g., is pressed and held for a period of time (e.g., about 1-2 seconds), a high temperature/high discharge mode 350, illustrated by a continuous red LED, is initiated by the controller 26. From this mode, a single actuation (e.g., a short depressing or a "click") of the actuator 262 selects an intermediate temperature/discharge mode 354, illustrated by a continuous white LED. Yet another click selects a low temperature/discharge mode 358, illustrated by a blue LED. A further click returns to the initial high temperature/discharge mode 350. These modes continue to cycle with every click of the actuator 262. To stop operation of the heating element 18, the actuator 262 is depressed for a time period (e.g., 1-2 seconds) (step 366) to turn off the supply of current to the heating element 18 and return to an off status 346. The battery controller 238 remains in an "ON" state unless there is a fault which results in interruption of current output from the receptacle 50.

Thus, the invention may provide, among other things, a heated hand garment, such as a glove 10, and a heating element 18 coupled to the glove 10 for warming a hand of the user. The glove 10 may include the heating element 18 having a heating element pattern, a battery-receiving receptacle 50, a power source such as a battery pack 22, and a controller 26 for controlling operation of the heating element 18 based on an actuator 262, discharging and/or charging of the battery pack 22.

Various features of the invention are set forth in the following claims.

What is claimed is:

1. A heated hand garment comprising:
- a body;
- a pocket positioned on the body;
- a heating element positioned on the body and operable to heat at least a portion of a hand of a user; and
- an electronic controller removably supported by the body, the electronic controller operable to control charging and discharging of a power supply configured to be supported by the body;
- wherein the power supply is removably coupled to the body, the power supply including
  - an input port removably coupled with a cable, the input port configured for receiving power from the cable to charge the power supply, and
  - an output port removably coupled with a connector plug, the output port configured for supplying power from the power supply, through the connector plug, and to the heating element,
- wherein the pocket includes a slot forming an opening to the pocket and extending from a wrist portion to a finger receptacle of the body, and wherein the power supply is received in the pocket through the slot.

2. The heated hand garment of claim 1, wherein the electronic controller is configured to electrically connect to a garment controller of the heated hand garment when the output port is electrically connected with the heated hand garment.

3. The heated hand garment of claim 1, wherein the input port is a Universal Serial Bus port, and wherein the output port is configured to supply DC power to the heating element.

4. The heated hand garment of claim 1, wherein the input port is configured to electrically connect to a battery charger for charging the power supply when the power supply is supported by the heated hand garment and when the power supply is not supported by the heated hand garment.

5. The heated hand garment of claim 1, further comprising a garment controller supported on the body and configured to electrically connect to the electronic controller when the electronic controller is supported by the body.

6. The heated hand garment of claim 1, further comprising an actuator configured to be engaged by a user to control the heating element.

7. The heated hand garment of claim 1, wherein the electronic controller is configured to be operated to control discharging of the power supply at a plurality of discharge levels, and wherein each discharge level corresponds to a heating level of the heating element.

8. The heated hand garment of claim 1, further comprising an actuator positioned on the body and configured to be engaged by a user to control the heating element.

9. The heated hand garment of claim 1, wherein the power supply includes a rechargeable battery pack and a battery-receiving receptacle.

10. The heated hand garment of claim 9, wherein the battery-receiving receptacle defines a longitudinal axis and a cavity extending along the longitudinal axis, and wherein the cavity is configured to removably receive the battery pack in one of a direction along the longitudinal axis or in a direction transverse to the longitudinal axis.

11. The heated hand garment of claim 9, wherein the battery-receiving receptacle includes terminals configured to electrically connect to terminals of the battery pack when the battery pack is received in the battery-receiving receptacle.

12. The heated hand garment of claim 9, wherein terminals of the battery pack are configured to electrically connect to the heating element via the battery-receiving receptacle.

13. The heated hand garment of claim 1, wherein the pocket is provided on a back side of the body, opposite a palm side of the body.

14. The heated hand garment of claim 1, wherein the connector plug extends from the pocket.

15. The heated hand garment of claim 1, wherein the slot includes a fastener for selectively closing the pocket.

16. A battery holder assembly for supplying power to an electronic device, the battery holder assembly comprising:

a battery pack;

a battery-receiving receptacle configured to be removably coupled to the electronic device, the battery-receiving receptacle including a cavity configured to receive the battery pack, a printed circuit board, an input port provided on a first end of the printed circuit board and configured to receive power to charge the battery pack, an output port provided on a second end, opposite the first end, of the printed circuit board and configured to supply power from the battery pack to the electronic device, a spring clip configured to bias the battery pack within the cavity, and a cap configured to close and retain the battery pack in the cavity; and an electronic controller operable to control charging and discharging of the battery pack while received within the battery-receiving receptacle, wherein the cap is rotatable between a locked position, in which the cap is engaged with the receptacle to retain the battery pack in the cavity, and an unlocked position, in which removal or insertion of the battery pack is permitted.

17. The battery holder assembly of claim 16, wherein the battery-receiving receptacle defines a longitudinal axis, wherein the cavity extends along the longitudinal axis, and wherein the battery pack is received in the cavity in one of a direction along the longitudinal axis or in a direction that is transverse to the longitudinal axis.

18. The battery holder assembly of claim 16, wherein the electronic controller is configured to electrically connect to another controller of the electronic device when the output port is electrically connected with the electronic device.

19. The battery holder assembly of claim 16, wherein the electronic device is a heated garment, and wherein the electronic controller is configured to control discharging of the battery pack at a plurality of discharge levels, each discharge level corresponding to a heating level of a heating element of the heated garment.

20. The battery holder assembly of claim 16, wherein the input port is a Universal Serial Bus port, and the output port is configured to supply DC power to the electronic device.

21. The battery holder assembly of claim 16, wherein the battery-receiving receptacle defines a longitudinal axis, and the printed circuit board is provided parallel to the longitudinal axis.

* * * * *